(12) United States Patent
Summers et al.

(10) Patent No.: US 10,109,041 B2
(45) Date of Patent: Oct. 23, 2018

(54) METHOD OF INTERACTING WITH A SIMULATED OBJECT

(71) Applicant: Jaguar Land Rover Limited, Whitley, Coventry, Warwickshire (GB)

(72) Inventors: Nathan Summers, Leamington Spa (GB); John Davies, Olney (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 13 days.

(21) Appl. No.: 14/430,902

(22) PCT Filed: Sep. 25, 2013

(86) PCT No.: PCT/EP2013/070005
§ 371 (c)(1),
(2) Date: Mar. 24, 2015

(87) PCT Pub. No.: WO2014/049014
PCT Pub. Date: Apr. 3, 2014

(65) Prior Publication Data
US 2015/0278999 A1    Oct. 1, 2015

(30) Foreign Application Priority Data
Sep. 25, 2012   (GB) .................................. 1217107.0

(51) Int. Cl.
*G06T 19/00*   (2011.01)
*G06T 15/20*   (2011.01)
(Continued)

(52) U.S. Cl.
CPC ................ *G06T 3/60* (2013.01); *G06F 3/011* (2013.01); *G06Q 10/10* (2013.01);
(Continued)

(58) Field of Classification Search
CPC ......... G06T 19/00; G06T 15/20; G06T 11/60; G06T 19/006; G06T 1/0007; G06T 7/70;
(Continued)

(56) References Cited

U.S. PATENT DOCUMENTS 7,418,408 B1    8/2008  Heppe
2008/0071559 A1  3/2008  Arrasvuori
(Continued)

OTHER PUBLICATIONS

"The Future of the Virtual Showroom is at Hand—Nissan Revs Up the Dealership Experience with Microsoft's Kinect for Windows," http:nissannews.com/en-US/nissan/usa/releases/the-future-of-the-virtual-showroom-is-at-hand-nissan-revs-up-the-dealership-experience-with-microsoft-s-kinect-for-windows, Aug. 22, 2012, 8 pages.
(Continued)

*Primary Examiner* — Ke Xiao
*Assistant Examiner* — Andrew Shin
(74) *Attorney, Agent, or Firm* — Reising Ethington P.C.

(57) ABSTRACT

A method of interacting with a simulated object the method comprising: generating a simulation of the object; displaying the simulation on a first display device; interacting with the simulation on the first display device; capturing a representation of the simulation from the first display device for display on a second display device; displaying the representation of the simulation on the second display device; interacting with the representation of the simulation on the second display device.

24 Claims, 17 Drawing Sheets

(51) Int. Cl.
| | |
|---|---|
| *G06T 11/60* | (2006.01) |
| *G06T 1/00* | (2006.01) |
| *G06K 9/00* | (2006.01) |
| *G06F 3/14* | (2006.01) |
| *G06T 3/60* | (2006.01) |
| *G06Q 10/10* | (2012.01) |
| *G06Q 30/06* | (2012.01) |
| *G06F 3/01* | (2006.01) |
| *G06T 15/08* | (2011.01) |

(52) U.S. Cl.
CPC ......... *G06Q 30/0601* (2013.01); *G06T 15/08* (2013.01); *G06T 2219/028* (2013.01)

(58) Field of Classification Search
CPC ... G06T 7/74; G06T 7/80; G09G 5/14; G09G 2360/04; G06K 9/00; G06K 9/183; G06K 9/50; G06K 9/222; G06K 9/48; G06K 7/10722; G06K 7/14; G06F 3/14; G06F 3/1454
USPC ............... 345/419, 427, 619, 629, 632, 633; 382/181, 183, 193, 202, 203; 235/454, 235/462.01
See application file for complete search history.

(56) References Cited

U.S. PATENT DOCUMENTS

| | | | | |
|---|---|---|---|---|
| 2010/0053164 | A1* | 3/2010 | Imai | G06F 3/011 345/427 |
| 2011/0134108 | A1 | 6/2011 | Hertenstein | |
| 2011/0191203 | A1 | 8/2011 | Hughes et al. | |
| 2011/0227827 | A1* | 9/2011 | Solomon | G06F 3/0321 345/158 |
| 2011/0295502 | A1* | 12/2011 | Faenger | H04M 1/7253 701/431 |
| 2012/0017236 | A1* | 1/2012 | Stafford | A63F 13/00 725/32 |
| 2012/0209715 | A1* | 8/2012 | Lotan | G06F 3/011 705/14.58 |
| 2012/0209749 | A1* | 8/2012 | Hammad | G06Q 30/06 705/27.1 |
| 2013/0110666 | A1* | 5/2013 | Aubrey | G06Q 30/0641 705/26.5 |
| 2014/0250203 | A1* | 9/2014 | Amanieux | G06F 17/30047 709/217 |

OTHER PUBLICATIONS

"Experience the All-New Ford Fusion Virtually Through Augmented Reality App," http://www.prnewswire.com/news-releases/experience-the-all-new-ford-fusion-virtually-through-augmented-reality-app.com, Dec. 13, 2011, 3 pages.
GB Combined Search and Examination Report for corresponding application No. 1217107.0, dated Jan. 13, 2013, 5 pages.
International Search Report for application No. PCT/EP2013/070005, dated Feb. 6, 2014, 3 pages.
Written Opinion for application No. PCT/EP2013/070005, dated Feb. 6, 2014, 4 pages.
Bharat "Audi Kinect powered showroom", Jul. 17, 2012, 5 pages, URL: http://www.damngeeky.com/2012/07/17/3155/audi-city-kinect-powered-showroom-lets-you-customize-your-dream-car-with-gestures.html.
Boxall "Audi City: The high-tech cyberstore that could be the future of buying cars", Jul. 17, 2012, 3 pages, URL: "https://www.digitaltrends.com/cars/audi-city-the-high-tech-cyberstore-that-could-be-the-future-of-buying-cars/".
European Office Action for EP application No. 13 770 884.8, dated Mar. 2, 2018, 11 pages.

* cited by examiner

Figure 12
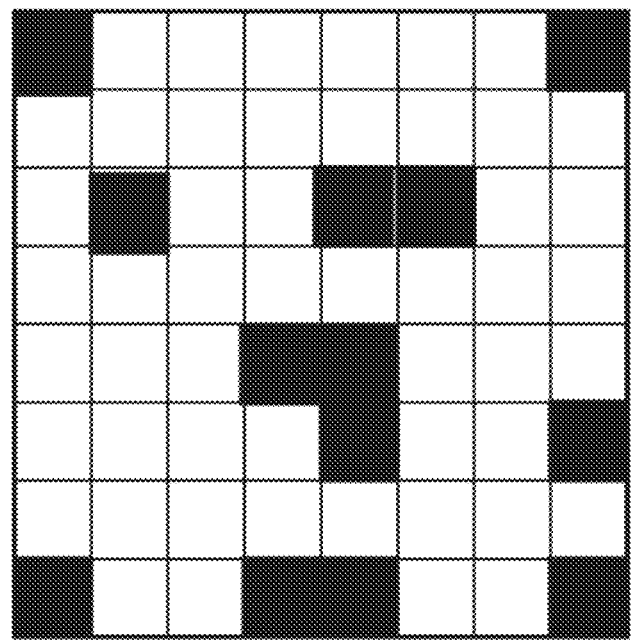
23

METHOD OF INTERACTING WITH A SIMULATED OBJECT

TECHNICAL FIELD

The present invention relates to a method of interacting with a simulated object and particularly, but not exclusively to interacting with a simulated object in a multi-screen environment. Aspects of the invention relate to a display system for interacting with a simulated object.

BACKGROUND

Prospective customers wishing to purchase a transaction item generally have one or more purchase routes available to them; purchase in a store, telephone order or online purchase via an online transaction platform (e.g. manufacturer's website). With the proliferation of high speed broadband internet connections many customers are favouring the online purchase route.

In some circumstances, particularly for large value purchases, a customer may initially research a transaction item online before visiting a retail outlet to either complete the transaction or to view the transaction item prior to an online purchase.

In some transaction environments the transaction item may comprise configurable elements and the online transaction platform that is available for the customer to use may allow these various configurable options to be displayed to the customer. For example, where the transaction item is a vehicle then the customer may have the option of exploring various configuration options relating to the vehicle they are interested in, e.g. paint colour and finish, interior trim options, exterior trim options etc. Any changes made while viewing the vehicle on the manufacturers website may be represented via an online rendering of the vehicle that has been selected.

Although the ability to configure aspects of the vehicle may be provided to a customer on the online transaction platform, often the visual experience that is available to them is limited by the display and processing limitations of the device they are viewing the vehicle from. For example, if a customer visits an online vehicle configurator via a mobile device then there are likely to fee processing and display limitations. Even if the customer visits the configurator from a home PC then there may be display limitations that mean that they do not receive a representative experience of the vehicle they are interested in.

Another method, by which vehicle manufacturers may allow prospective customers to experience their range of vehicles is via a motorshow. However, such motorshows are expensive for the manufacturer to exhibit at and the foot-fall of potential customers at such a show only represents a small proportion of the potential market.

It is an aim of the present invention to address disadvantages associated with the display of a transaction item.

SUMMARY OF THE INVENTION

According to an aspect of the present invention, there is provided a method of interacting with an object, the method comprising: generating a simulation of the object; displaying the simulation on a first display device; interacting with the simulation on the first display device; capturing a representation of the simulation from the first display device for display on a second display device; displaying the representation of the simulation on the second display device; interacting with the representation of the simulation on the second display device.

The present invention provides a method of interacting with an object in which the object is simulated and displayed on a first display device and in which a representation of the simulated object from the first display device may be captured and displayed on a second display device. Both the simulated object on the first display device and the representation of the simulation on the second display device may be interacted with, in this manner a simulation of an object may be projected/displayed on a first screen such that a user can interact with it and the ability to capture a representation of the simulation allows a further user or users to effectively interact with the simulation on a second display device. It is noted that the method steps above may occur in various different orders or simultaneously. For example, the representation captured for display on the second display device may occur before any interaction with the simulated object on the first display device has occurred.

The first display device may be in communication with rendering means, the rendering means rendering the simulation of the object. For example, the first display device may be a large scale television screen which is in communication with a processor that renders the simulated object.

The simulation may be a three dimensional simulation of the object. Interaction with the simulation on the first display device may comprise interacting with a gesture control input mechanism, such as a Kinect® style interface. The simulation may be animated so that interaction with the simulated object is arranged to mimic real world responses of the object.

For example, if the simulated object was a vehicle then a user may be able to "open" the doors of the simulated vehicle by making an appropriate gesture.

The second display device may be part of a mobile computing device, such as a tablet computer. The mobile computing device may further comprise an image capture device such as an integrated camera and capturing the representation of the simulation may comprise taking an image of the simulation on the first display device with the image capture device of the second display device.

Interaction on the second display device may be via one or more of: a touch screen input device; gyroscopic input device; motion sensor based input device (e.g. an accelerometer); speech input device. The representation of the simulation of the object on the second display device may be a further simulation of the object.

In one example, the simulation of the object on the first display device and the further simulation of the object on the second display device may be manipulated independently of one another. In this manner multiple users may interact with a simulation of the object without interfering with one another.

The simulation of the object on the first display device and the further simulation of the object on the second display device may be rendered by the same rendering means. In other words there may be a central rendering processor that is responsible for producing all simulations of the object. The communication paths between the processor and the various display devices may be via a wired link or may be via a wireless connection. In an alternative, the second display device may comprise its own processing means and the further simulation of the object on the second display device may be simulated by the processing means on the second display device.

The first display moans may comprise a display screen displaying one or more reference markers and capturing a representation of the simulation on the first display device may comprise capturing an image of a reference marker. In order to identify the location of the first display means when capturing a representation of the displayed object, the first display device may incorporate identifiable reference points within the display. For example, the corner of the display area of the first display means may display a recognisable pattern of pixels that can be used to locate the edges of the display area when capturing an image via an image capture device. In an alternative arrangement, the physical edges of the first display device may form the reference markers.

Each reference marker may be associated with a different display function. For example, capturing an image of a reference marker may cause a view of the object on the first display device to be displayed on the second display device.

Capturing a representation of the simulation on the first display device for display on a second display device may comprise placing the second display device in a users line of sight with the first display device, the second display device being arranged to display an augmented reality version of the image on the first display device. The augmented reality version of the image from the first display device may comprise overlaying the image captured from the first display device with a further image. The augmented reality version may be manipulated independently of the representation on the first display device.

Capturing a representation of the simulation from the first display device for display on a second display device may comprise capturing an image of an information element with an image capture device on the second display device.

Configuration settings of the object may be changed on the second display device and sent (e.g. to a rendering processor) such that the simulation on the first display device is updated to reflect the changed configuration options.

According to another aspect of the present invention, there is provided a display system for interacting with an object, the system comprising: a first display device; a second display device wherein the system is arranged to generate a simulation of the object; display the simulation on a first display device; allow a user to interact with the simulation on the first display device; allow a user to capture a representation of the simulation from the first display device for display on a second display device; display the representation of the simulation on the second display device; allow a user to interact with the representation of the simulation on the second display device.

The invention extends to a carrier medium for carrying a computer readable code for controlling a server to carry out the method of the first aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which:

FIG. 12 shows examples of an information element according to an embodiment of the present invention being read by an element of the system component shown in FIG. 3;

DETAILED DESCRIPTION

In the following description embodiments of the present invention relating to the method of interacting with a simulated object on a display arrangement are described in the context of a transaction for a transaction item (e.g. the purchase of a vehicle).

Figure 1:
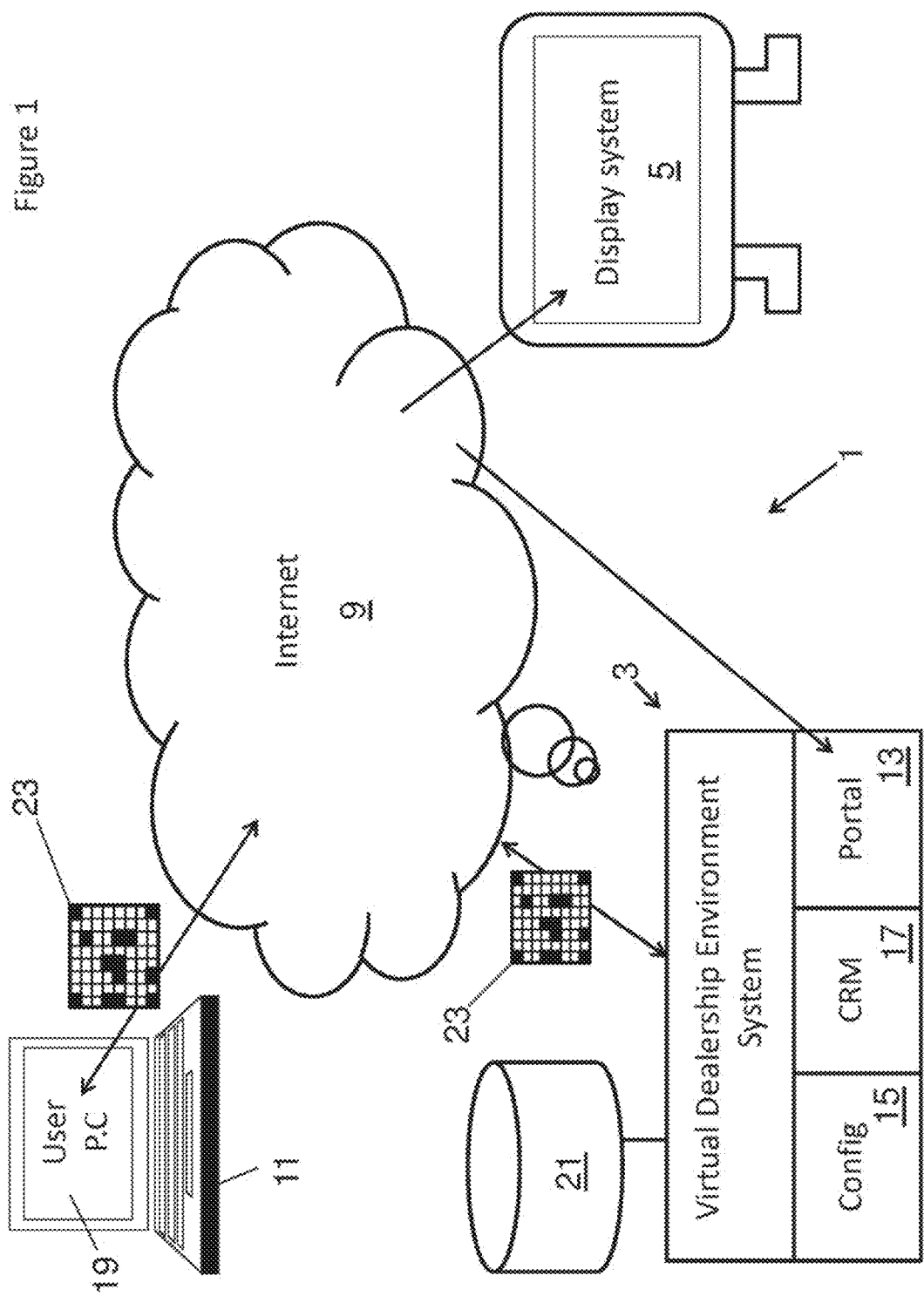
FIG. 1 shows an overview of the architecture of a transaction management system.
Figure 2:
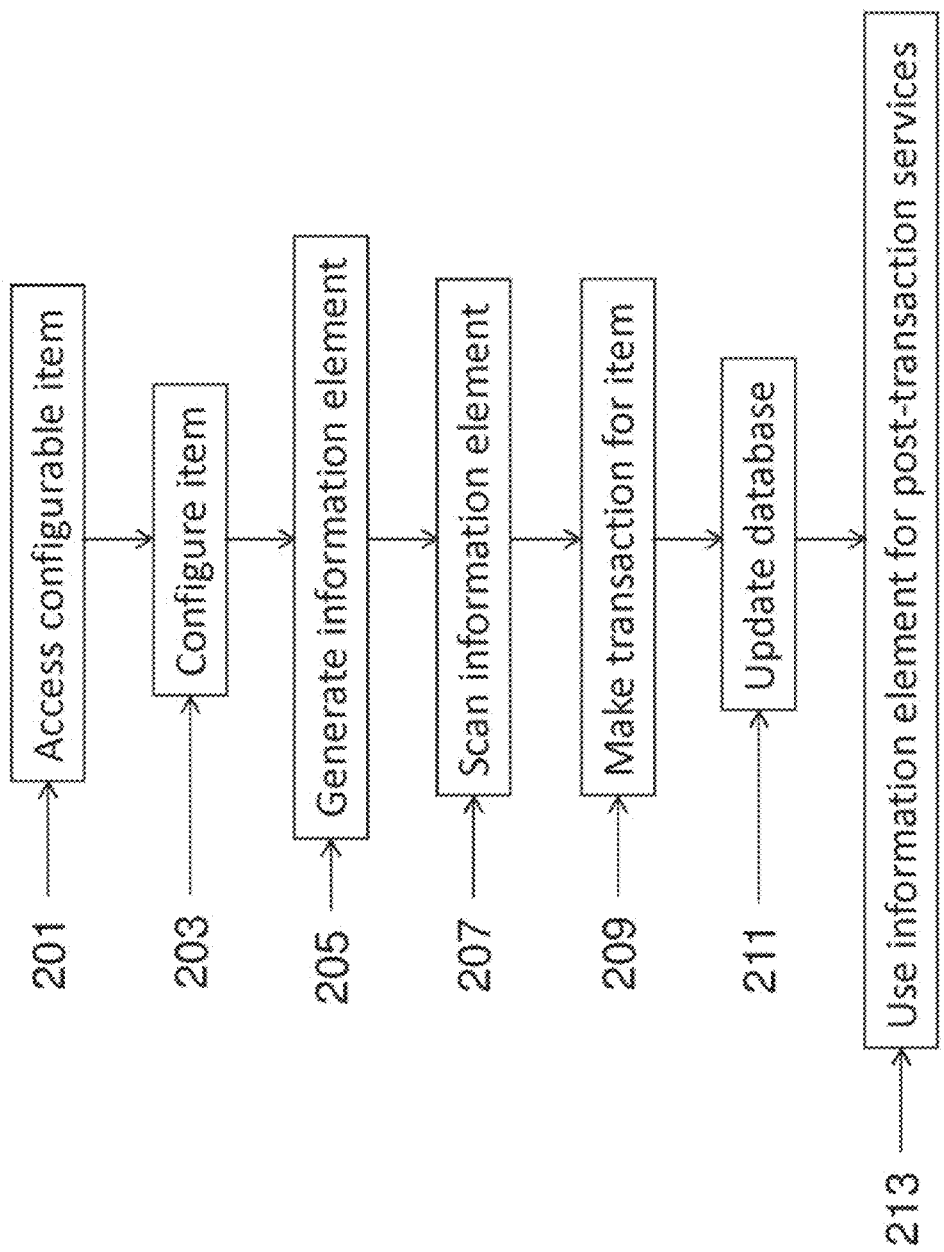
FIG. 2 is a flow chart of the lifecycle of a transaction within the transaction management system of FIG. 1.

FIGS. 1 and 2 and their associated description relate to an architecture of a transaction management system and a method of using such a system. These figures and their associated description are given to provide a context for describing embodiments of the present invention.

FIGS. 3 to 11 describe a display system in accordance with embodiments of the present invention and the various ways in which a user or users may interact with such a display system. For the sake of clarity the use of such a system is described from the viewpoint of the purchase of a vehicle but it is to be appreciated that the described embodiments of the present invention may be used in any environment in which an object is simulated and displayed such the user(s) may interact with it.

Turning to FIG. 1 a transaction management system 1 compatible with embodiments of the present invention is shown. The transaction management system 1 comprises a transaction server 3 and a display system 5. The display system comprises a display system in accordance with embodiments of the present invention and as described in detail with reference to FIGS. 3 to 11 below.

As shown in FIG. 1, the server 3 and display system 5 are located remotely from one another and are in communication with one another via the internet 9 (or any another suitable communications network, e.g. a bespoke communications network or a mobile communications based network). It is however noted that the server 3 and display system 5 could be co-located at the same physical location.

As well as being in communication with the display system 5, the server 3 may also be accessed by users at a user computing device 11 (such as a PC, smartphone, laptop or any other suitable computing device). For the sake of clarity only one user computing device is shown in FIG. 1 although it is to be appreciated that a plurality of such computing devices may interact with the server 3 at any given time.

The server further comprises a portal means 13 in the form of a portal module through which a user at the computing device 11 may interact with the server 3 (and through which the server 3 may interact with the display system 5), configuration means 15 in the form of a configuration module and customer relationship management (CRM) means 17 in the form of a customer relationship management modulo.

In use, the server may be arranged to output data (via the portal means 13) to the computing device 11 to allow a visual representation of a transaction item to be displayed on a display screen 19 of the computing device. The user may configure the transaction item to display various different configuration options and the configuration means 15 is arranged to manage the configuration process.

Any user related data entered during the users interaction with the server 3 may be recorded and captured within a CRM means 17 and stored within a database 21. Database 21 may also store details of the various transaction items that the user can access along with each items potential configuration settings/options.

Also, shown in FIG. 1 is an information element 23, the operation of which is described in detail below. The information element is shown being supplied to the user's computing device 11. It is also noted that the information element 23 and/or the visual representation of the transaction item may also be sent to the display system 5 as described in greater detail below.

The transaction management system 1 may be used to manage the lifecycle of a transaction made by a user. The lifecycle management process is depicted in FIG. 2 which is described with further reference to FIG. 1.

In Step 201 a user at a computing device 11 connects to the transaction management system 1 and in particular the server 3 via the portal means 13 and the internet 9 and accesses a configurable transaction item. The transaction item may be a vehicle and the accessing of a configurable transaction item may comprise choosing a vehicle model.

In Step 203 the user interacts with the configuration means 15 to configure the transaction item. The configuration options may relate to configurable elements on the selected vehicle, e.g. paint colour and finish, interior and exterior trim options etc. As different configuration options are selected the server 3 may output an updated representation of the transaction item for display on the display screen 19 of the computing device 11.

Once the user has configured the transaction item the server 3 stores the configured transaction item, e.g. in the database 21, to allow later retrieval and generates an information element 23 in step 205 that is linked to the configured transaction item data. The information element 23 may be in the form of an optical representation, examples of which may be a barcode, such as a two-dimensional barcode, QR code, glyph, or a dynamic optical encoding of content. The CRM means 17 may be arranged to generate the information element and to manage the link between the information element 23, configured transaction item and user details may be managed by the CRM means 17. The data associated with the configured transaction item that is stored in the database 21 comprises the transaction item selected by the user and the user selected configuration options relating to that transaction item.

Once the configured transaction item has been linked to the information element the user is able to retrieve the configuration settings (the selected user configuration options) for the transaction element at a later point in time, in step 207, by scanning the information element. For example, where the information element comprises an optical information element, the action of scanning may comprise placing the information element in the field of view of a camera or scanning with a barcode reader. In the example of an information element that is encoded in a near-field communication device the action of scanning may comprise bringing an NFC reader into close proximity with the NFC device that stores the information element.

Having scanned the information element 23 the configuration settings for the transaction item may be retrieved at a point of sale system from the database 21/CRM means 17 on the server 3 and the user may make a transaction to acquire the transaction item (step 209). In more detail, the data from the scanned information element 23 is received at the portal means 13 and passed to the CRM means 17 which can retrieve the selected configuration options for the transaction element 23 from the database 21.

Although not shown, in FIG. 2 it is noted that a security check/validation step may be incorporated within the process flow of FIG. 2 (for example within either step 209 or 211) in which a user identification process is triggered and possibly a credit check. For example, a user may be required to scan an identification item (such as a driving license) as part of the scanning step 207 in order to retrieve their configuration options. A credit check step may also be initiated, especially for high value transaction items, in which a user's ability to acquire the transaction item is made. This may be an automated credit check or may involve interaction with a human operator (who may be remotely located at, for example, a call centre). As well as determining the user's ability to acquire the transaction item such a credit check may also prevent a user from inadvertently acquiring a transaction item by accidentally selecting a purchase option.

In Step 211 the database 21 is updated (via the CRM means 17) with details of the transaction. For the user in question the database now stores details of a unique information element for that user, and the transaction item such as the vehicle model and configuration settings for that vehicle and details of the transaction.

In Step 213 the information element may be used to access post-transaction services. For the vehicle transaction example this may comprise scanning the information element again to receive details of the progress of the vehicle build or to access servicing or maintenance options (e.g. the transaction element could be scanned and the user presented with the option of booking a regular service).

Figure 3:
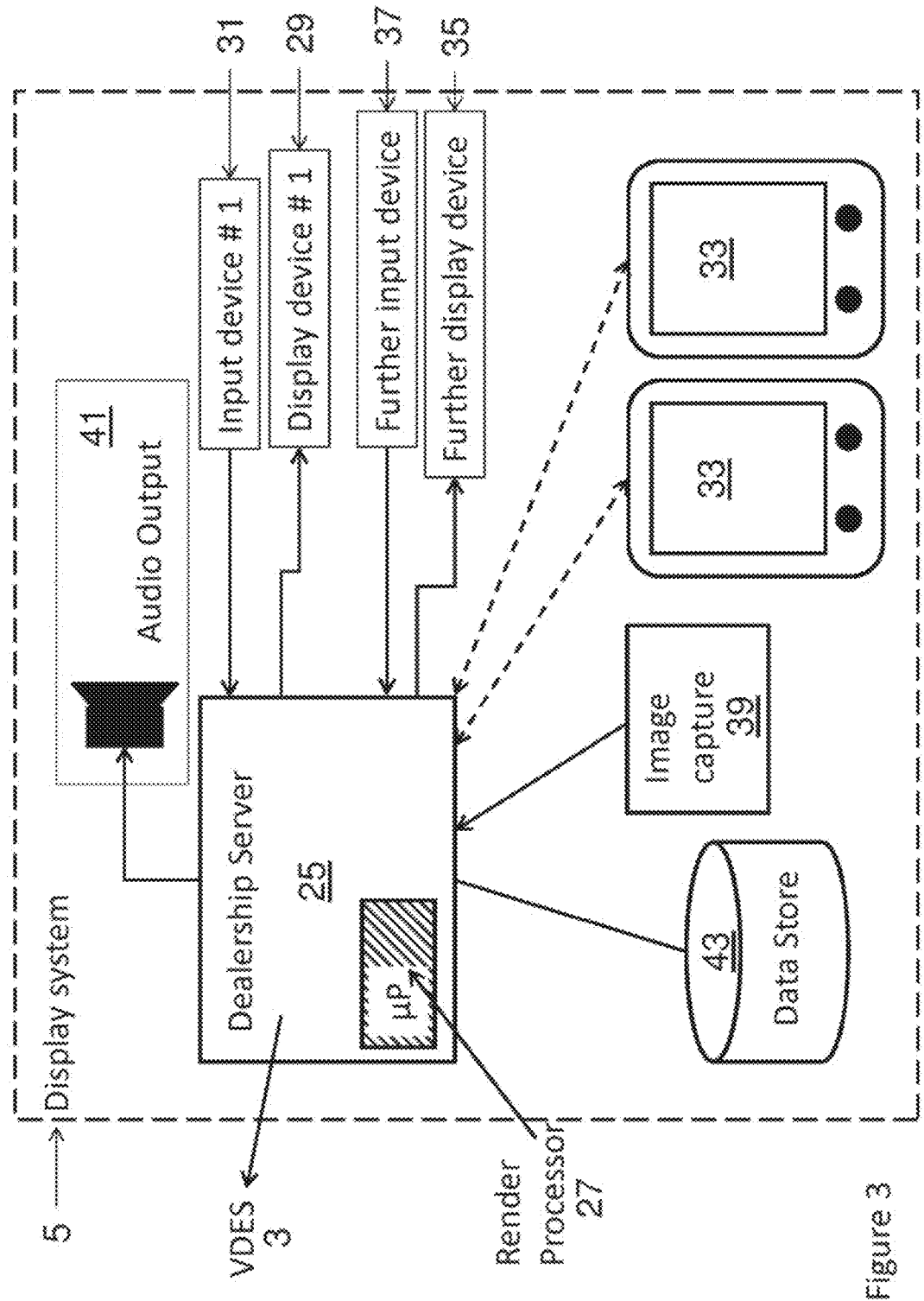
FIG. 3 shows the elements of a system component of FIG. 1 in greater detail.

FIG. 3 shows a display system in accordance with embodiments of the present invention, if is also noted that the display system 5 is a system component of the transaction management system 1 of FIG. 1 shown in more detail, it can be seen that the display system comprises a display server 25 which includes a means for rendering 27 in the form of a render processor. The display server is also in communication with a first display device 29, a first input device 31, second display devices 33 (which are represented in the figure by a portable tablet computing device such as an iPad® but which may be any suitable computing device such as a laptop, PC etc.) and a further display device 35 and further input device 37.

The display system 5 also includes an image capture device 39, such as a camera or barcode scanner, an audio output device 41, such as a loudspeaker or arrangement of speakers, and a data store 43.

The display system 5 shown in FIG. 3 is in communication with the server 3 end may receive from the server 3 data relating to the transaction item that the user has configured according to the process of FIG. 2 above. Such data may comprise information to allow the render processor 27 to render s simulation/representation of the transaction item for display on the first display device 29 and/or the second display devices 33.

It is noted that the simulation of the transaction item that is displayed on the first display device 29 may fee manipulated via the first input device 31. Suitable input devices include touchpads (which may be embedded within the display screen of the first display device or which may be a standalone input device in communication with the render processor 27), gesture recognition input devices (such as the Microsoft Kinect® system), speech recognition input devices, keyboard and mouse input devices etc.

It is also noted that the second display devices 33 may also allow manipulation of the representation of the transaction item that is displayed, e.g. In the case of a tablet computing device the input may be received via a touchscreen.

According to embodiments of the present invention, the display system 5 represents a location a user visits to interact with a computer generated simulation of the transaction item that they have configured according to the process depicted in FIG. 2. For example, the display system 5 may represent an actual or a "virtual" car dealership where the user can view and interact with a near life-size rendering of the transaction item that they have configured.

The display system 5 may be located in the same physical location that the transaction item would normally be purchased from (e.g. if may be located in a car showroom, an actual car dealership) or alternatively if may be located in another environment (e.g. shopping mall, airport departure lounge etc., a "virtual" car dealership).

The display system 5 affords the user the opportunity to see a rendering, prior to purchase, of their selected and configured transaction item on a display device with superior display functionality than the computing device 11 that they started the transaction lifecycle upon.

In embodiments of the invention the first display device 29 may comprise a high definition screen of sufficient dimensions to be able to display the transaction item on substantially life-size scale.

As noted above the transaction item may be configured by the user from the computing device 11 and data relating to the configured transaction item may be stored in the database 21. The display server 25 may retrieve this data using the information element 23 that is provided to the user at the end of the configuration process.

The information element 23 may be scanned by the image capture device 39 and the display server 25 may use the information encoded within the information element to contact the server 3 and request details of the transaction item that the user is interested in and the configuration settings/options for that item. Depending on the particular embodiment of the invention the information element may represent a unique identification code that is linked at the server 3 side to the user and their configured transaction item. Alternatively, the information element may encode user data, transaction item data and configuration options data.

Prior to displaying a render of the transaction item on the first display device 29 or second display devices 33 the user may be able to fine tune the configuration of the transaction item via a further display device 35 and further input device 37. In one embodiment the first display device 29 and further display device 35 may be of similar dimensions to one another and be located side by side such that updates to the configuration of the transaction item can be "moved" from the further display device 35 to the high definition render of the transaction item on the first display device 29. In embodiments where the further input device 37 is a touchscreen within the further display device 35 then the "movement" of the updated configured transaction item may comprise the user "swiping" the updated configured transaction item across from the further display 35 to the first display device 29.

The audio output 41 may be used to simulate a sound environment normally associated with the transaction item. For example, where the transaction item is a vehicle then the sounds may comprise simulated traffic noise or muffled traffic noise if the interior of the vehicle is being displayed.

Figure 4:
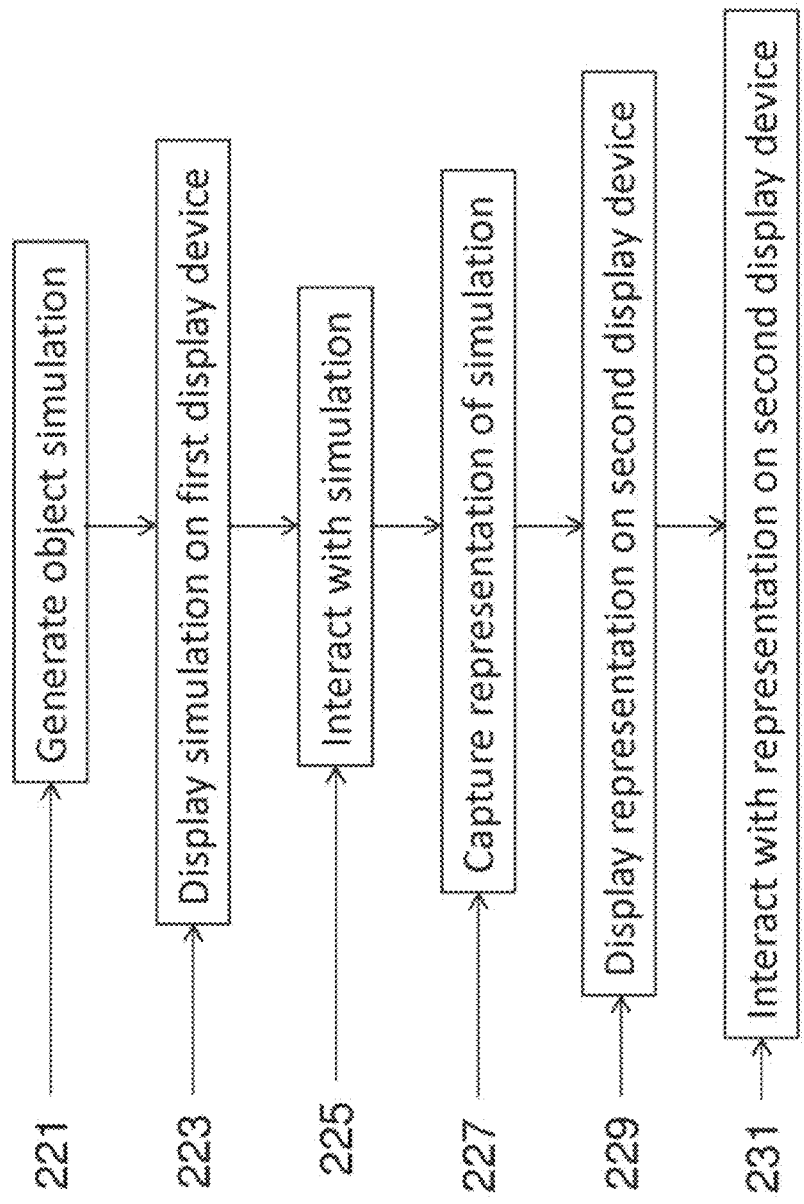
FIG. 4 is a flow chart of the process of interacting with elements of the component shown in FIG. 3

FIG. 4 is a flow chart of the process of interacting with elements of the system component (display system 5) shown in FIG. 3 in accordance with further embodiments of the invention.

In Step 221 a simulation of the transaction item (i.e. the object to be simulated) is generated by the render processor 27. In the embodiment depicted in FIG. 3 the rendering means 27 is located within the display system 5. In alternative embodiments the rendering means may be located remote from the display system, for example in the server 3.

In step 223 the simulation is displayed on the first display device 29 and in step 225 the user may interact with the simulation shown on the first display device 29.

The simulation that is generated and rendered by the rendering means 27 may be a 3D simulation of the transaction item which is arranged to read to input from the input device 31 to simulate real world interactions with the transaction item (for example the vehicle orientation may be changed by moving relative to the first display device 29. The relative size of the simulated object may also be changed by moving further away from or closer to the first display device 29). In the example of a vehicle as the transaction item the simulation may respond to user input such that doors on the vehicle may be opened and closed within the simulation. The user may also foe able to change the view provided on the first display device 29 such that the point of view of the simulation changes from an outside view of the vehicle to an inside view. The user may also interact with controls within the cockpit of the vehicle within the context of the simulation.

In Step 227 the user or another user may capture a representation of the simulation on the first display device 29 for display on a second display device 33 and in Step 229 the representation of the simulation may be displayed on the second display device 33. In Step 231 the user (or the other user) may interact with the representation of the simulation on the second display device 33.

Figure 6:
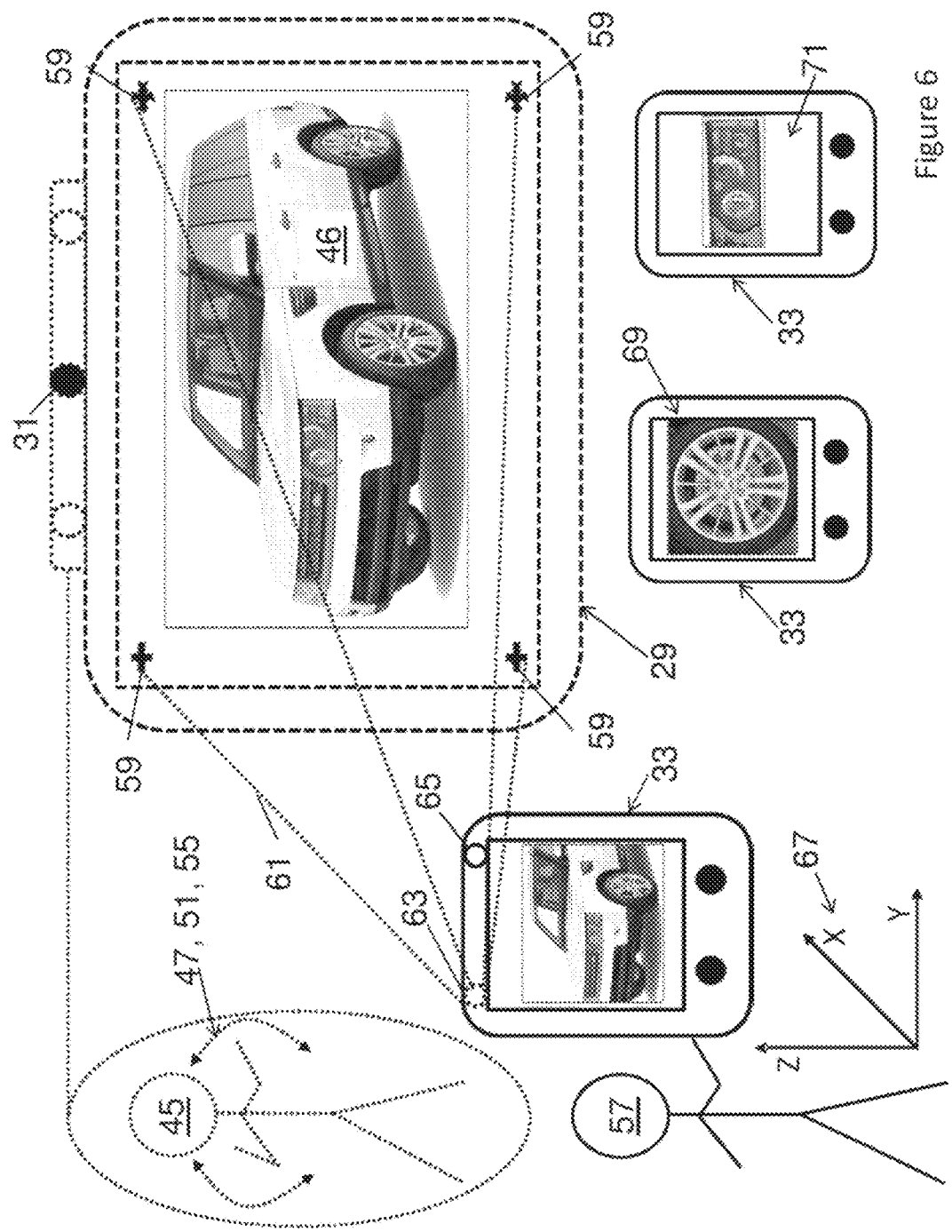
FIG. 6 shows two users interacting with components of the system shown in FIG. 3.

The second display device 33 may comprise an image capture device of its own, e.g. a built in camera, to enable a representation of the simulation on the first display device to be captured (see, for example, feature 63 in FIG. 6). The process of capturing the representation may comprise taking a photograph of the first display device using the second display device. The captured representation may then be manipulated on the second display device.

It is noted that the second display device 33 may be the user's own device which is joined into the display system 5. Alternatively, the second display device may be a permanent part of the display system 5. In both options the display device 33 may interact with the dealership server via a Bluetooth® connection or via a Wi-Fi or other suitable wireless connection. The second display device may conveniently comprise a dedicated program application (e.g., a smart device "app") that is arranged to communicate with the server 25 in order to allow manipulation of the captured representation on the second display device 33. Alternatively, the second display device may communicate with the server 25 via a browser program.

Figure 5:
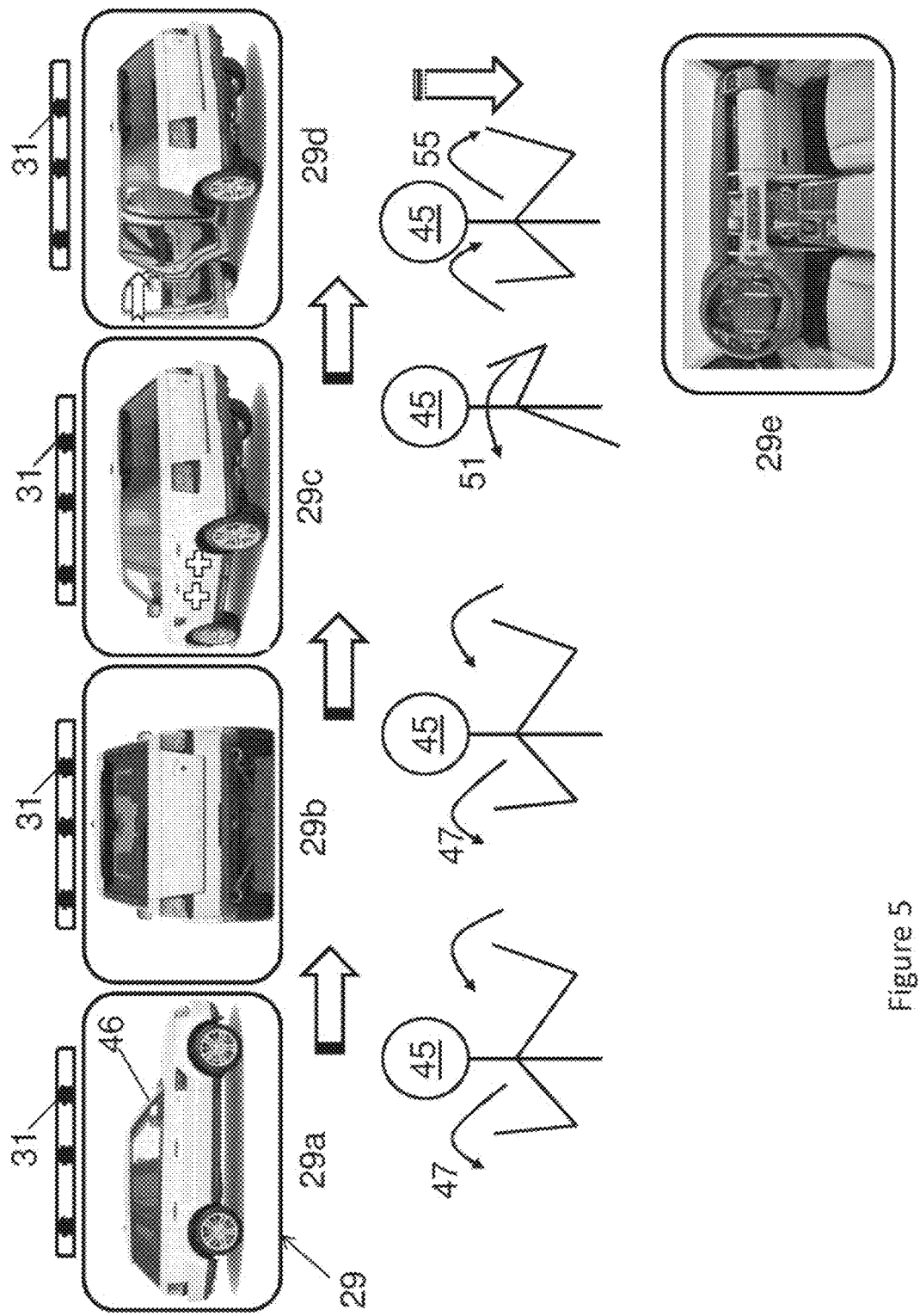
FIG. 5 shows a user interacting with components of the system shown in FIG. 3.

In step 225 (as described above) the user may interact with the simulation on the first display device 29. FIG. 5 shows an example of such interaction.

FIG. 5 shows a sequence of five views (29a to 29e) of the first display device 29 over time. The first image in the sequence is at the tap left of the figure and the final image in the sequence is at bottom right. The input device 31 for the first display device is shown above the display and, in the example shown, comprises a Kinect® style control device. The user 45 may therefore interact with the en-screen representation of the transaction item via a gesture control mechanism.

In the first view 29a in the sequence the display device 29 is showing a side view of a vehicle (the vehicle, in this context, representing the user configured transaction item 46). A first gesture 47 by the user 45 causes the image of the vehicle to rotate so that a rear view is shown, the second view 29b in the sequence. The user 45 then repeats the first gesture 47 to rotate the vehicle again so that a perspective side view is shown in view 29c.

As noted above the simulation is rendered such that real world interactions with the rendered object may be made, in view 29c some interaction prompt symbols 49 have been overlaid on the simulated object to indicate to the user 45 that they may interact with simulation in some way. In the present example the symbols 49 are located over the vehicle doors to indicate to the user 45 that the doors of the vehicle may be opened.

The user 45 then performs a second gesture 51 which causes the doors of the vehicle to open (view 29d). A further overlay symbol 53 has appeared in view 29d to indicate that the user may enter the vehicle within the context of the simulation. The user then performs a third gesture 55 to enter the vehicle within the simulation (view 29e).

Although the embodiment shown in FIG. 5 uses gesture controls, specifically arm movements of the user 45, to control the simulation on the first display device 29 if is to be appreciated that other control commands may be used and alternative control devices may be used.

For example, where a gesture based input device 31 is used, the simulation of the transaction item may respond to the user 45 physically moving position. For example, movement towards the screen may bring the simulated object closer, movement to the left or right may initiate rotation of the device.

Alternative input devices may comprise a voice input device so that the simulation can be manipulated by voice command, a control device that incorporates one or more motion sensors, a separate touchpad for touch based input etc.

It is further noted that in alternative embodiments more than one input device type may be used to interact with the simulated object, e.g. a combination of gesture control as shown in FIG. 5 plus vocal control could be used such that the transition between views 29c and 29d could be accomplished by speaking the command "open doors" instead of performing gesture 51.

Steps 227 to 231 above describe how a second display device 33 may capture a representation of the simulated object from the first display device 29 and display that on the second display device 33 such that the user or a further user may interact with the representation.

FIG. 6 shows an embodiment in which a second display device 33 is used by a further user 57.

FIG. 6 shows the first user 45 in front of the first display device 29 and first input device 31. The first user 45 interacts with the simulated object on the first display device 29 via a series of gestures 47, 51, 55 as described in FIG. 5.

As well as the simulated object, the first display device 29 in FIG. 6 additionally displays a number of reference markers 59. In the embodiment shown in FIG. 6 there are four cross shaped reference markers 59, one in each corner of the first display device 29. The reference markers 59 are used to enable a second display device 33 to locate the first display device 29 and the display of the simulated object 46 within the field of view 61 of an image capture means 63 (e.g. a camera) on the second display device 33. In the embodiment shown in FIG. 6 the image capture means is provided by a rear facing camera 63 (as opposed to a front facing camera 65 which may be used to provide video calling functionality).

Although four cross shape reference markers 59 are shown in the embodiment of FIG. 6 it is to be appreciated that the reference markers may take other shapes and may be located at different, locations on the first display device 29 (e.g. centre fop/bottom and halfway up left/right hand sides).

The reference markers may be visible to the user 57 or alternatively may be invisible to the user 57 but visible to the camera 63 and second display device 33. The reference markers 59 may be bidden within the main image on the first display device 29 by a suitable stenographic technique.

Once the second display device 33 has located the position of the first display device then a representation of the simulation on the first display device may be presented to user 57 on the second display device 33 as shown in FIG. 6. In the event that the second display device comprises motion control sensors (e.g. gyroscope and accelerometers) then movement 67 of the second user 57 relative to the first display device may cause the representation of the simulation to move.

The second display device may also be arranged to allow the user 57 to take "snapshots" 69, 71 of the simulated object. As shown in the bottom right corner of FIG. 6, the user 57 has taken snapshots of a vehicle wheel assembly (69) from the simulated vehicle and of a headlight assembly/array (71).

Having taken a snapshot, the second user 57 may interact independently with the feature shown in the snapshot. For example, where the snapshot is of the vehicle wheel then the user 57 may call up different wheel designs or data related to the wheel, e.g. tyre type. The user 57 may also be able to alter the viewpoint shown in the snapshot by interacting with the second display device (e.g. via a touchscreen).

In the embodiment shown in FIG. 6 user 57's interaction, on the second display device 33, with the representation of the simulation of the simulated object is independent of user 45's interaction with the simulation of the simulated object on the first display device 29.

Figure 7:
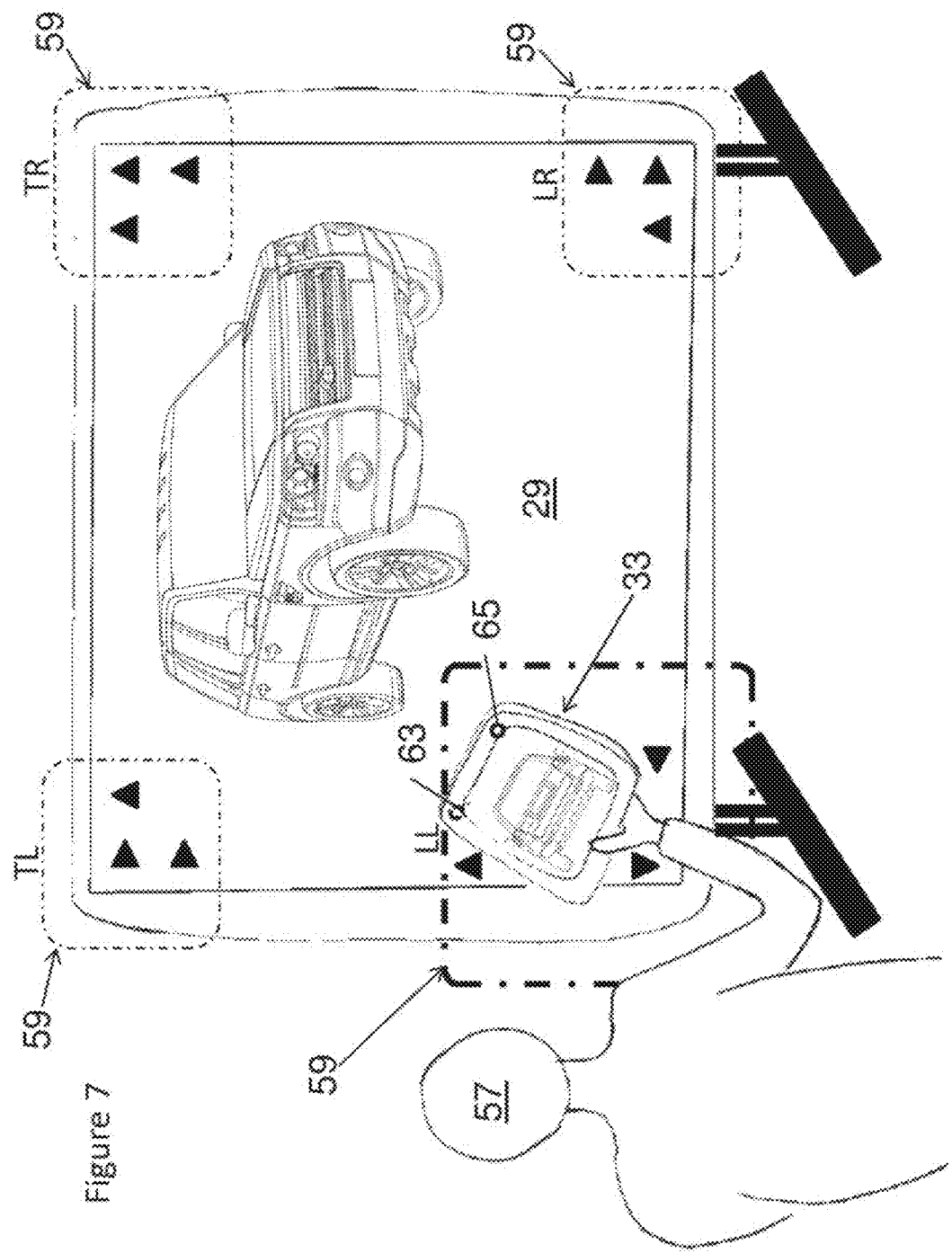
FIGS. 7 to 10 show various embodiments in which a second display device interacts with a first display device of FIG. 3.
Figure 8:
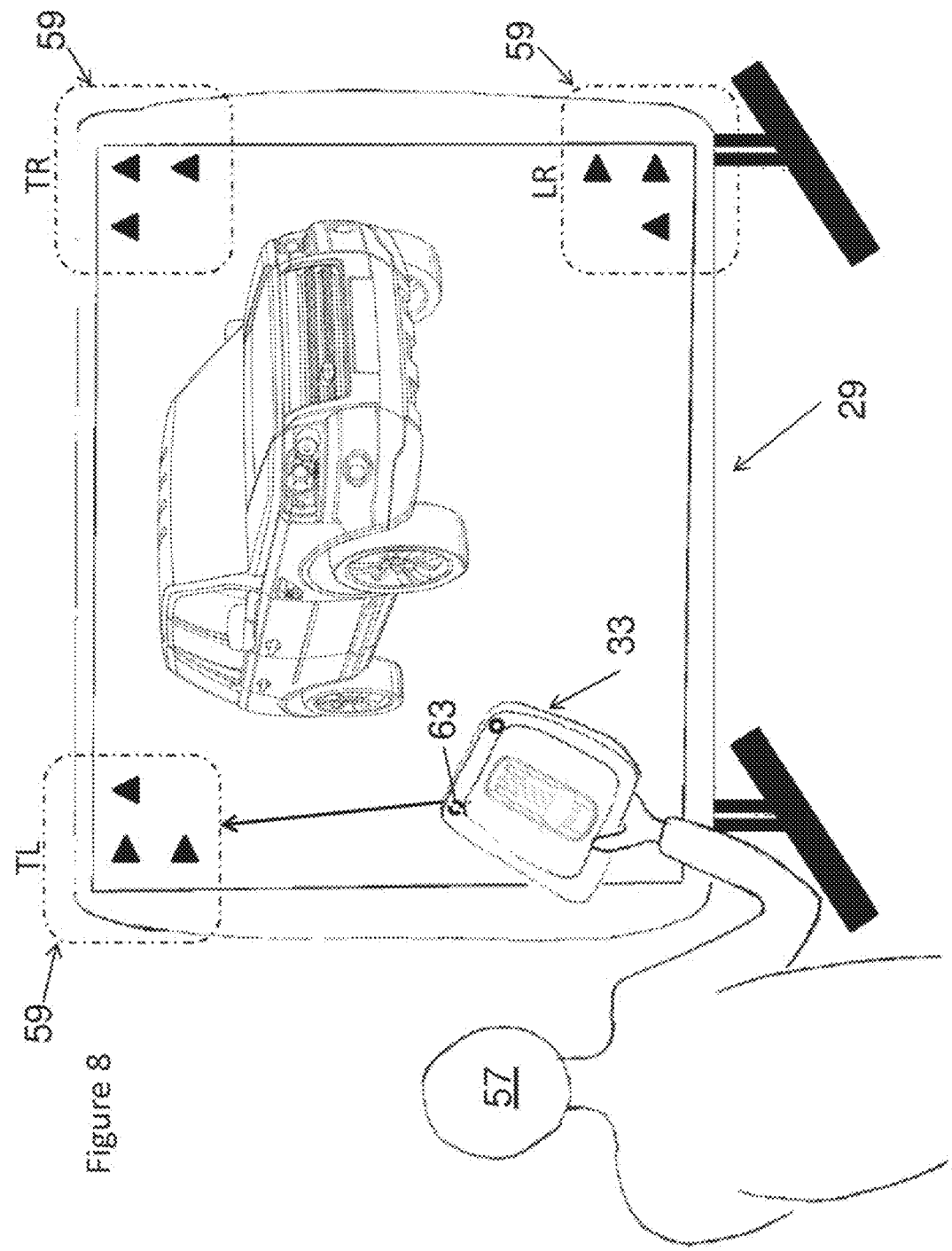

FIGS. 7 and 8 show a further embodiment in which the reference markers 59 may be used to select the view on the second display device 33. In FIG. 7 the first display device 29 is showing a front perspective view of a vehicle and the user 57 has directed the camera 63 of the second display device 33 at the lower lefthand reference marker 59, in response the second display device 33 is showing a rear view of the vehicle being simulated on the first display device 29.

In FIG. 8 the user 57 is now directing the second display device 33 at the top left reference marker 59 and in response the second display device 33 is showing a bird's eye view of the vehicle.

It is noted that the view of the first display device 29 may be static or moving (e.g. because the first user 45 is interacting with the first display device 29) but recognition of the reference markers 59 by the second display device 33 launches predetermined views of the simulated object or predetermined functions or menus.

It is noted that, in this embodiment of the invention, the representation of the simulation that is shown on the second display device 33 may be generated by the render processor 27 and sent via a suitable communications channel (e.g. Wi-Fi or Bluetooth®) to the second display means 33. In an alternative embodiment the second display device 33 may comprise a processor capable of generating the representation.

Figure 9:
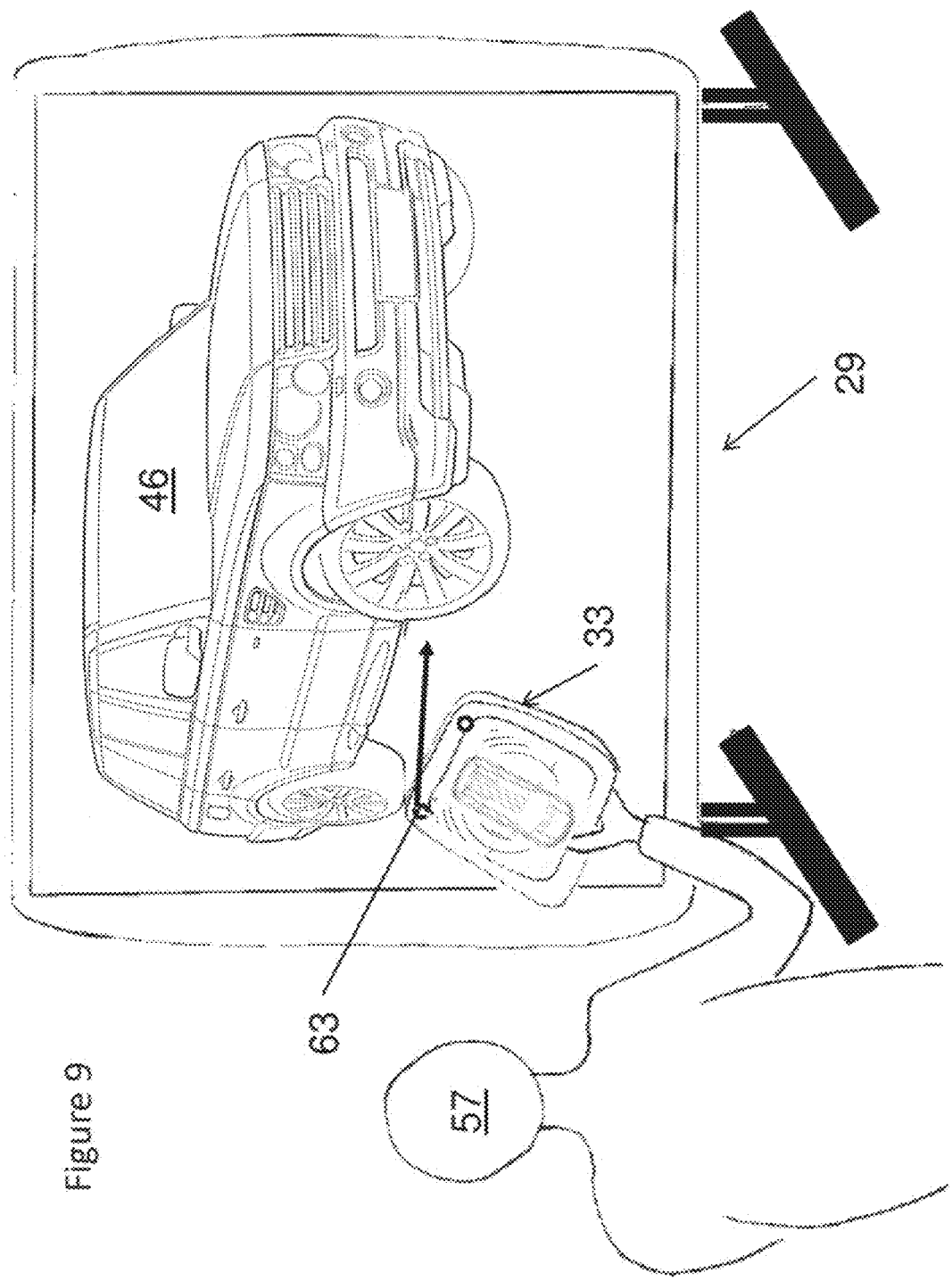
Figure 10:
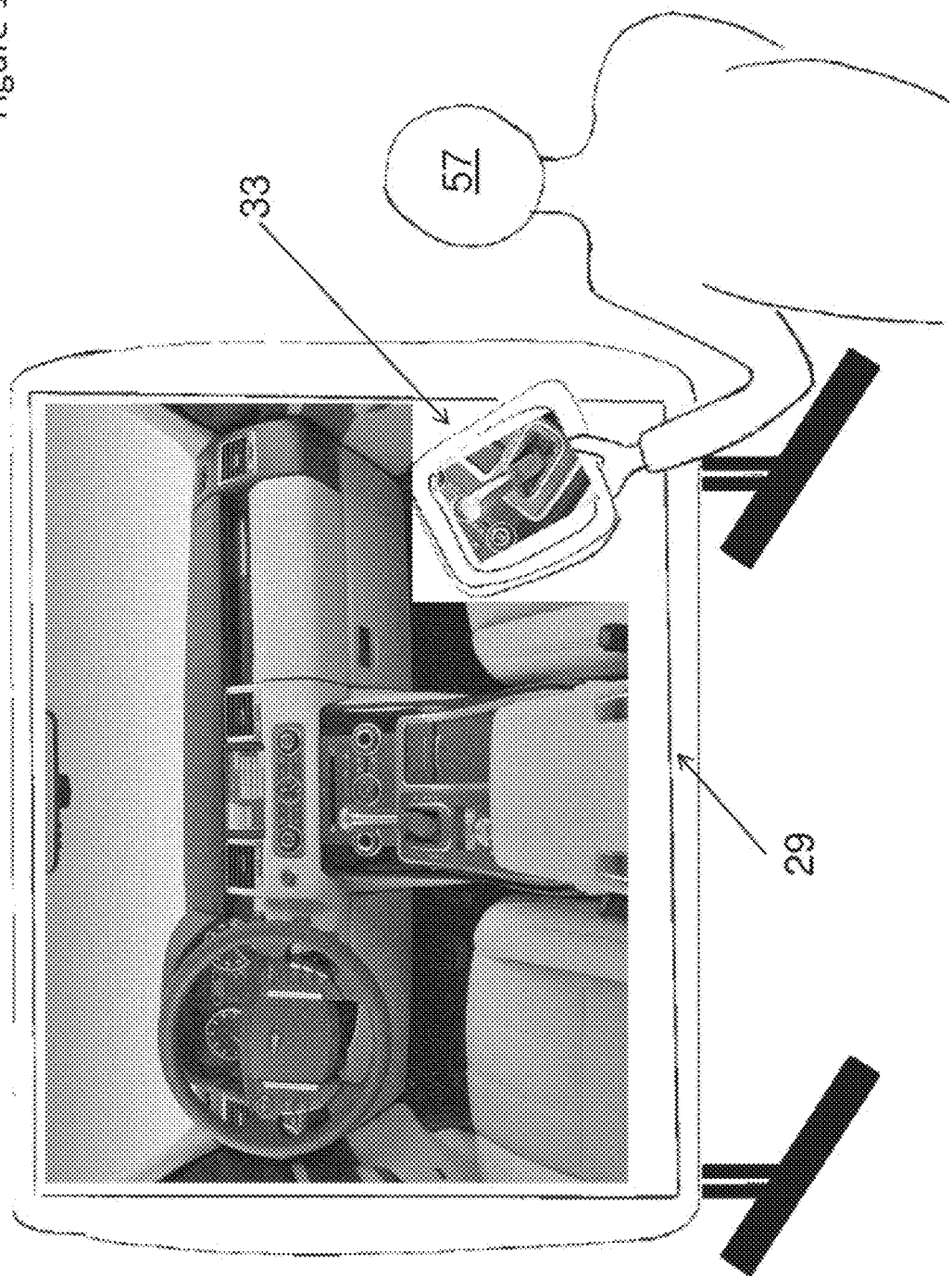

As well as operating in a "snapshot" mode or using the reference markers 59 to trigger functionality or views, the second display device 33 may, in a further-embodiment, operate in an augmented reality mode as shown in FIGS. 9 and 10.

In FIG. 9 the user 57 has directed the integrated camera 63 of the second display device at the first display device 29 such that a particular feature of the simulated object 46 is visible on the display screen of the second display device 33. In the embodiment shown in FIG. 9, the first display device 29 is showing a front perspective view of a vehicle and the user 57 is holding the second display device 33 in their line of sight to the first display device.

The camera 63 (not shown in FIG. 9) of the second display device 33 captures the simulation shown on the first display device 29 and the second display device 33 shows the vehicle from the same point of view as the first display device 29. As shown in FIG. 9 the user's line of sight is to the wheel of the vehicle and the second display device 33 is showing a representation of the wheel visible on the first display device 29. The augmented reality mode of the second display device 33 then allows the user 57 to display different wheel options. As shown in FIG. 9 the wheel spoke design as shown on the first display device 29 is different to the wheel spoke design shown on the second display device 33.

In one embodiment of the present invention the user 57 may update the simulated object 46 on the first display device 29 by transferring the representation on the second display device 33 to the first display device 29. In one example, this may comprise swiping a pre-determined gesture on the screen of the second display device 33 or entering a particular command via the input interface on the second display device 33.

In FIG. 10 the first display device 29 is showing an interior view of a vehicle. The camera 63 (not shown in FIG. 10) of the second display device 33 has been trained on the gear stick shown on the first display device 29. As user 57 moves relative to the first display device 29, motion sensors within the second display device 33 detect this movement and adjust the view of the gear stick. In this manner the user 57 may change their point of view of the simulation shown on the first display device 29 and in the embodiment of FIG. 10 this allows the user 57 to effectively move around the gear stick so that they can view it from different angle.

Figure 11:
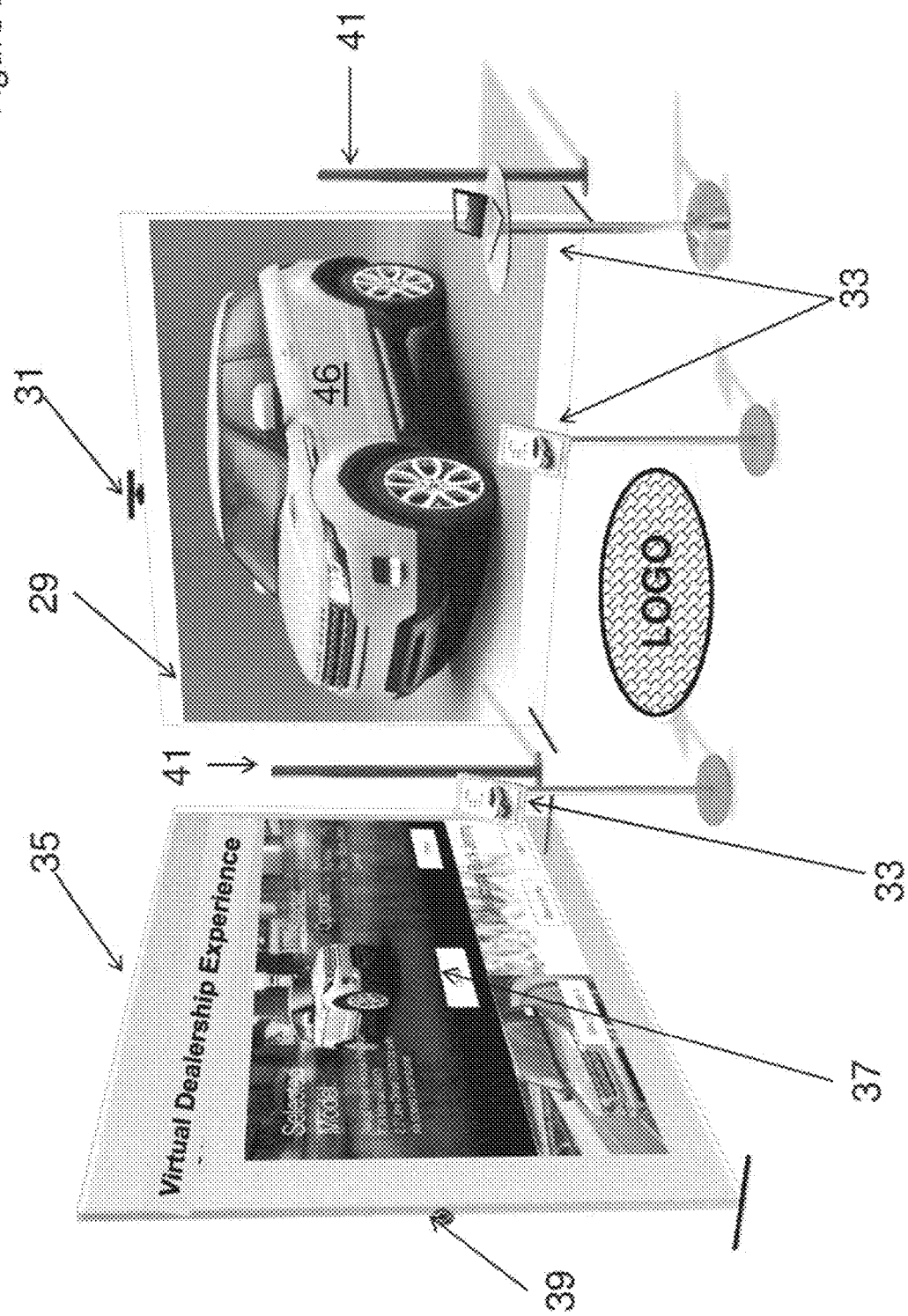
FIG. 11 shows a display system in accordance with an embodiment of the present invention.

FIG. 11 shows an embodiment of the present invention which depicts an arrangement of a first display device 29, a number of second display devices 33 and a further display device 35.

It can be seen that the first display device 29 is displaying a simulation of a vehicle 46 which a user may interact with via the input device 31 located above the screen area of the first display device.

In this embodiment a further display device 35 is provided which displays the configuration options/settings selected by the user from their computing device 11 (not shown in FIG. 11) in steps 201 and 203 described above. These settings are retrieved from the server 3 upon presentation of an information element 23 in accordance with further embodiments of the present invention at the image capture device 39. The further display device 35 essentially comprises a large scale configuration screen which is touch enabled (input device 37) to allow the user to make further adjustments to their configuration settings before rendering the transaction item (vehicle) on the first display device 29 or to make further adjustments upon reviewing the simulation on the first display device 29.

In step 205 of FIG. 2 above the server 3 generates an information element 23 that is linked to the user's details and also to the configured transaction item that the user has configured via their user computing device 11. Such an information element 23 may be used in accordance with further embodiments of the present invention to trigger different functionality in the display system 5. FIG. 12 shows a representation of one embodiment of an information element and further functionality of the information element is described in FIGS. 13 to 18.

The information element 23 shown in the embodiment depicted in FIG. 12 is an 8-by-8 grid in which individual grid cells may be in a first state (black cell) or a second state (white cell). By varying the state of the various cells in the information element a unique identifying information element may be created. As described above, this unique information element 23 may, via the CRM means 17, be used to link user data (e.g. name, address, contact details etc.) to a transaction item and the users selected configuration options.

Alternative embodiments of the information element may comprise: larger or small grids (e.g. a 16-by-16 grid or a 6-by-6 grid); QR codes; barcodes; glyphs; content that is dynamically encoded (e.g. a repeating sequence of images) or any other mechanism that is suitable to encode content that may then be later retrieved by scanning the information element.

Figure 13:
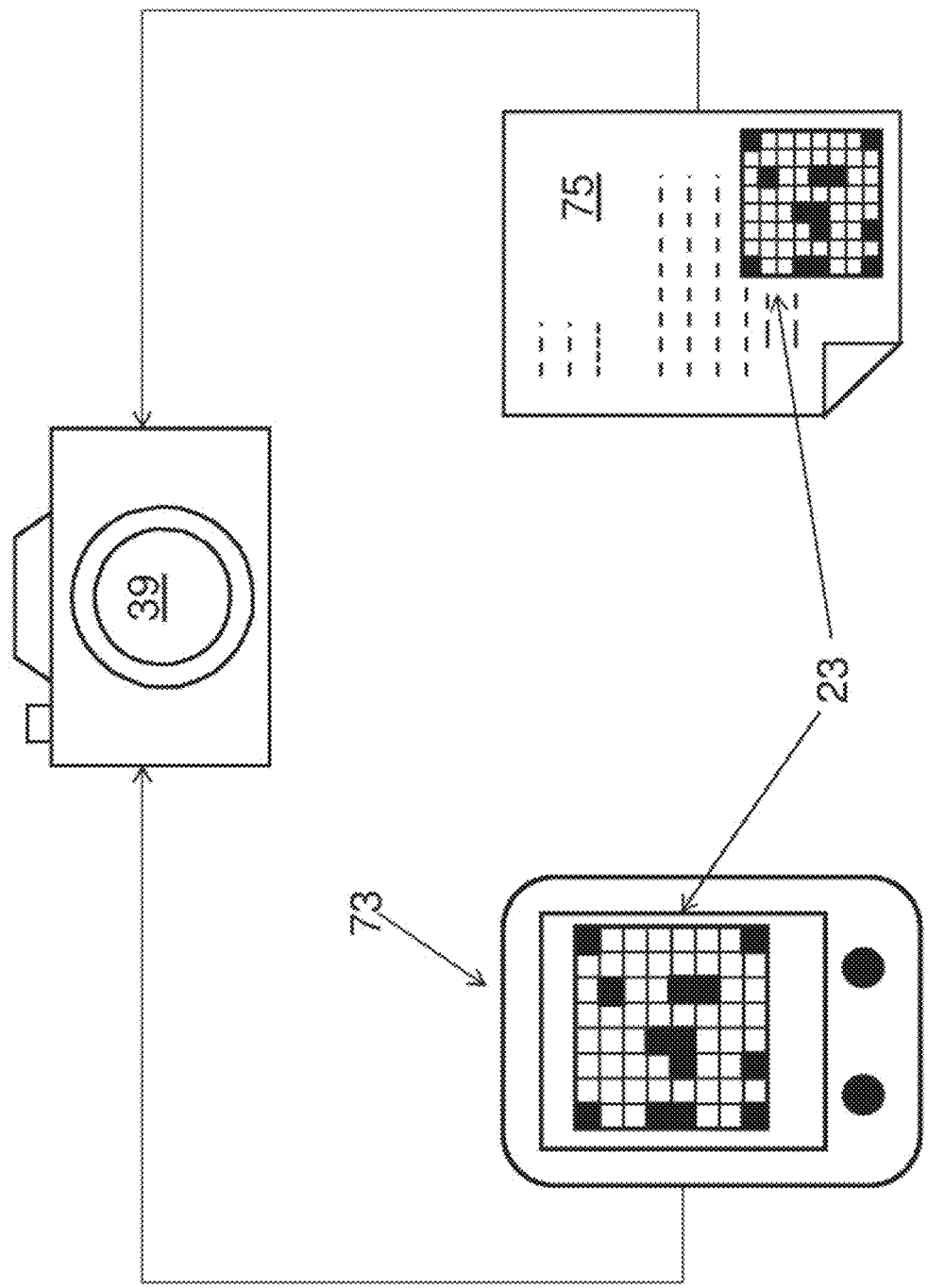
FIG. 13 shows information elements in accordance with a further embodiment of the present invention.

As shown in FIG. 13, the information element 23 that is generated by the server 3 may be sent to a user's mobile telecommunications device 73 or may be sent to the computing device 11 for printing as a paper document 75.

Once the user has received the information element 23 that is linked to their configured transaction item they may visit a location (such as a vehicle dealership) where the information element 23 is scanned (in step 207) by an image capture device 39 such that the user's details and data relating to their configured transaction item may be retrieved from the server 3. The information element may encode a user identifier or may also encode a unique reference locator (URL) address of the server 3.

In embodiments of the present invention the information element 23 may be constructed in such a way that obscuring parts of the information element 23 to the image capture device 39 may be used to trigger different functionality in a display system 5.

Figure 14:
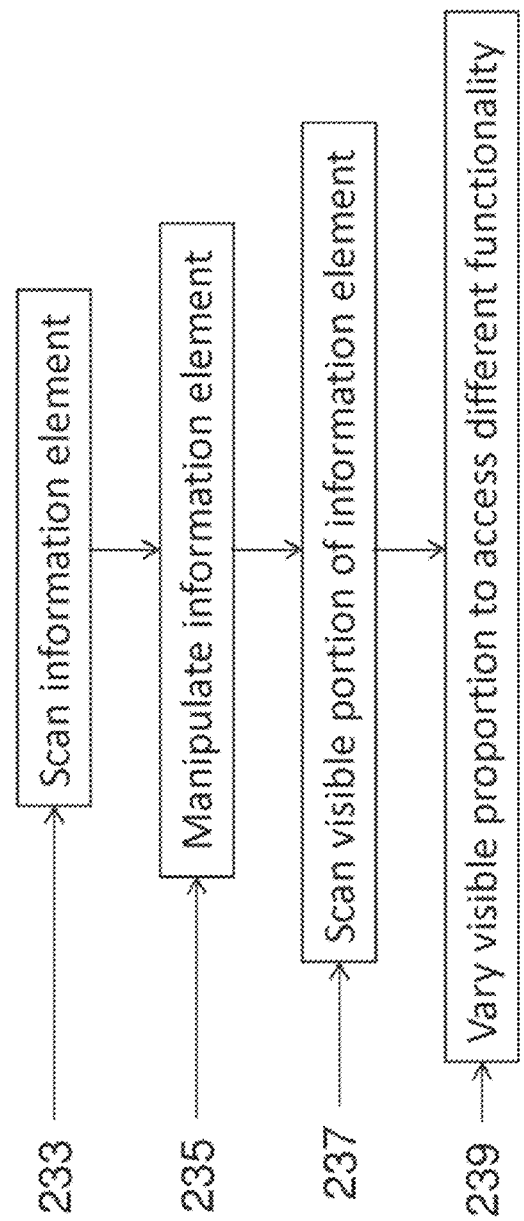
FIG. 14 is allow chart showing the process of manipulating an information element in accordance with embodiments of the present invention.

FIG. 14 shows the process of using an information element 23 to trigger different functionality according to embodiments of the present invention.

In step 233 the information element 23 is presented to the image capture device 39 in order to be scanned to retrieve the data related to the information element. Scanning the information element 23 in this manner allows the server 25 of the display system 5 to retrieve user data and configuration options data relating to the transaction item stored in the database 21 linked to the server 3. Having retrieved the data related to the information element the transaction item may be displayed, e.g. on the first display device 29 of the display system.

In step 235 the information element 23 is manipulated such that re-scanning the information element (In step 237 below) results in the image capture device 39 capturing a different representation or version of the information element.

Manipulating the information element 23 may comprise rotating the information element 23 relative to the rotation it was scanned in step 233. The server 25 may then detect the rotation of the element 23 when the element is scanned in step 237 below and trigger functionality based on the rotation type. To aid detection of rotation of the element 23 the information element 23 may be constructed such that it contains certain reference features that the image capture device 39 and server 25 can detect. For example, the corner elements may be coloured or shaded differently to one another.

Manipulating the information element 23 may also comprise obscuring a part of the information element 23 such that there is a visible portion and an obscured portion of the information element 23. Obscuring the information element 23 may be achieved simply by the user placing their hand over a portion of the information element 23 (either on the mobile telecommunications device 73 or on the printed document 75). Alternatively, a mask may be provided in order to obscure part of the information element 23. Where the information element 23 is displayed on a mobile device 73, the device 73 may be arranged to obscure part of the element 23 by changing the on-screen representation of the information element 23 (as discussed in relation to FIG. 16 below).

The description below is presented in the context of obscuring the information element 23 to trigger predetermined functions. However, if is to be appreciated that embodiments of the present invention may additionally or alternatively use rotation of the information element 23 to trigger such functions.

In step 237 the partially obscured information element 23 is scanned again such that the image capture device only captures the visible portion of the element 23. A processor (e.g. the server 25) in communication with the image capture device 39 may then interpret the captured image and trigger a pre-determined function in dependence on the particular part of the information element that is visible (e.g. change view of the object on the first display device 29, change colour of simulated object on the first display device 29, open a menu on the first display device 29 or on the further display device 25 etc.).

Varying the part of the information element that is obscured, in step 239, may then be used to trigger different functionality. Per example, obscuring different quadrants of the information element 23 shown in FIG. 12 may be linked to different functionality. The user may trigger this functionality by obscuring a certain quadrant of the information element 23 and then re-scanning the element 23 with the image capture device 39.

The image capture device 39 may be in communication with a computing device (e.g. the server 25) shown in FIG. 3 which may be arranged to interpret the information element 23 and to interpret the information element 23 when only a pad of the element is visible.

For example, upon scanning the full information element 23 in step 233 the computing device may retrieve or download data associated with the information element 23. The computing device may also at this time retrieve/download a series of partially obscured versions of the same information element each of which is linked with a particular function that the computing device could initiate in the event that the partially obscured information element is re-scanned. Since the computing device is downloading the relationship between the partially obscured versions and the functionality to be triggered on re-scanning the information element 23, this relationship may be altered between different users such that in one case obscuring the top left corner of the element might mean "change colour" and in another case might mean "show interior view".

In an alternative example, the computing device may be programmed such that obscuring a certain portion of an information element 23 results in the same functionality being triggered regardless of the actual information element being scanned.

As discussed in more detail below a single information element 23 associated with a particular user may be used to access multiple transaction items that the user has configured. Alternatively or additionally, the same information element 23 may be used to access multiple sets of configuration options that the user has configured.

Figure 15:
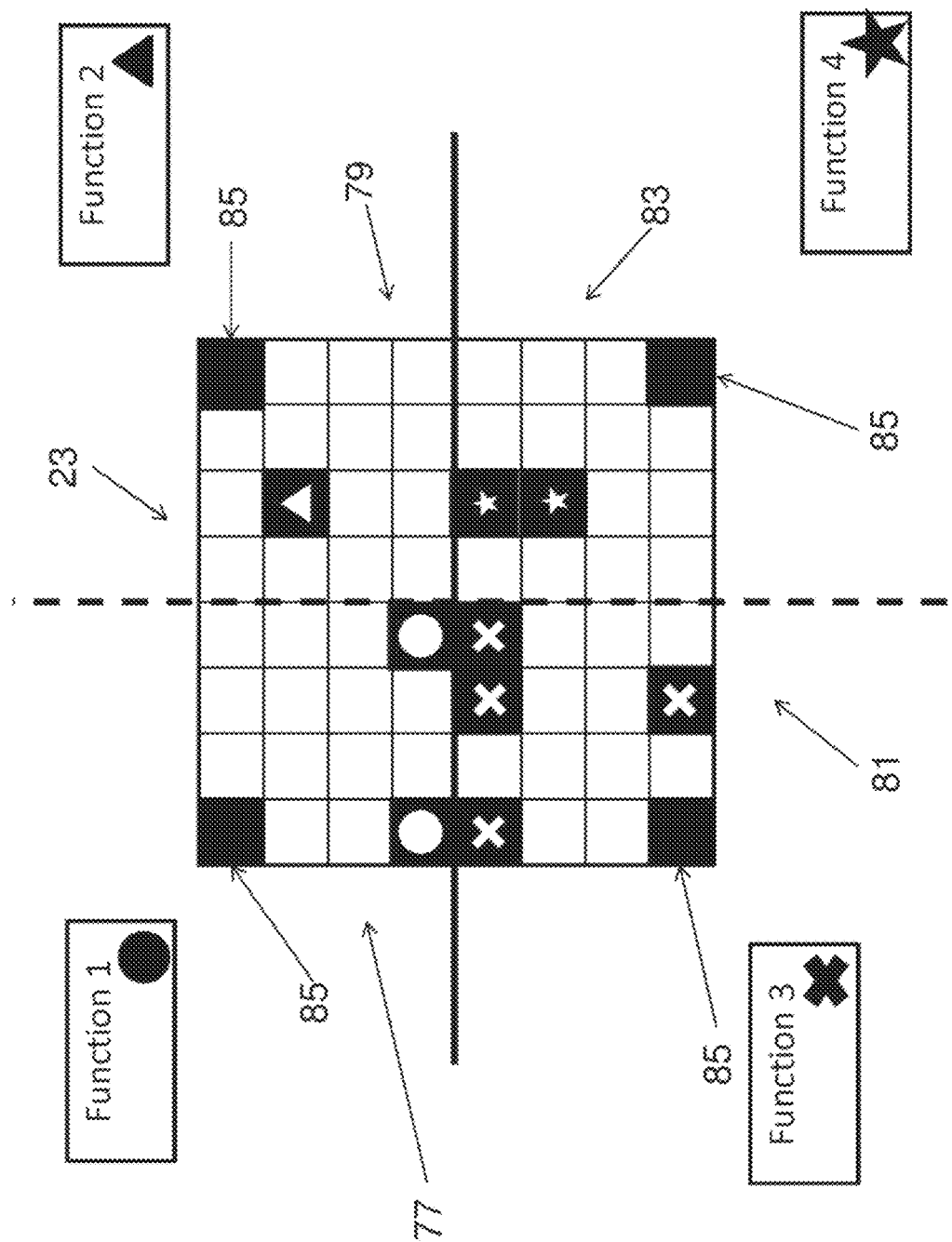
FIG. 15 shows an information element in accordance with a still further embodiment of the present invention.

FIG. 15 shows the information element from FIG. 12 but further indicates the different functionality that may be triggered by re-scanning the information element 23 with the image capture device 39.

In FIG. 15 the information element is shown divided into four quadrants (77, 79, 81, 83) each of which is associated with a different function (Functions 1-4). The specific functionality is indicated next to each quadrant of the information element 23. In this manner a user is provided with instructions as to how to use the information element 23 to trigger different functionality.

Within the information element 23 shown in FIG. 15, the cells of each quadrant may be provided with a different shading or colour scheme to provide a further visual indicator to a user of the different functionality that the element may be able to trigger. This is shown in FIG. 15 via the circle, triangle, cross and star shading in the various quadrants, it is however noted that such shading/colour schemes would not be necessary for the information element 23 to be used to trigger different functionality. All that would be required would be to obscure pads of the element.

It is noted that, where a shading/colour scheme is used, the corner cells 85 of the information element 23 may all be left in a default colour/shading. This is to provide the image capture device 39 with an identifiable reference point in each quadrant so that the boundary of the information element 23 can be easily identified.

Figure 16:
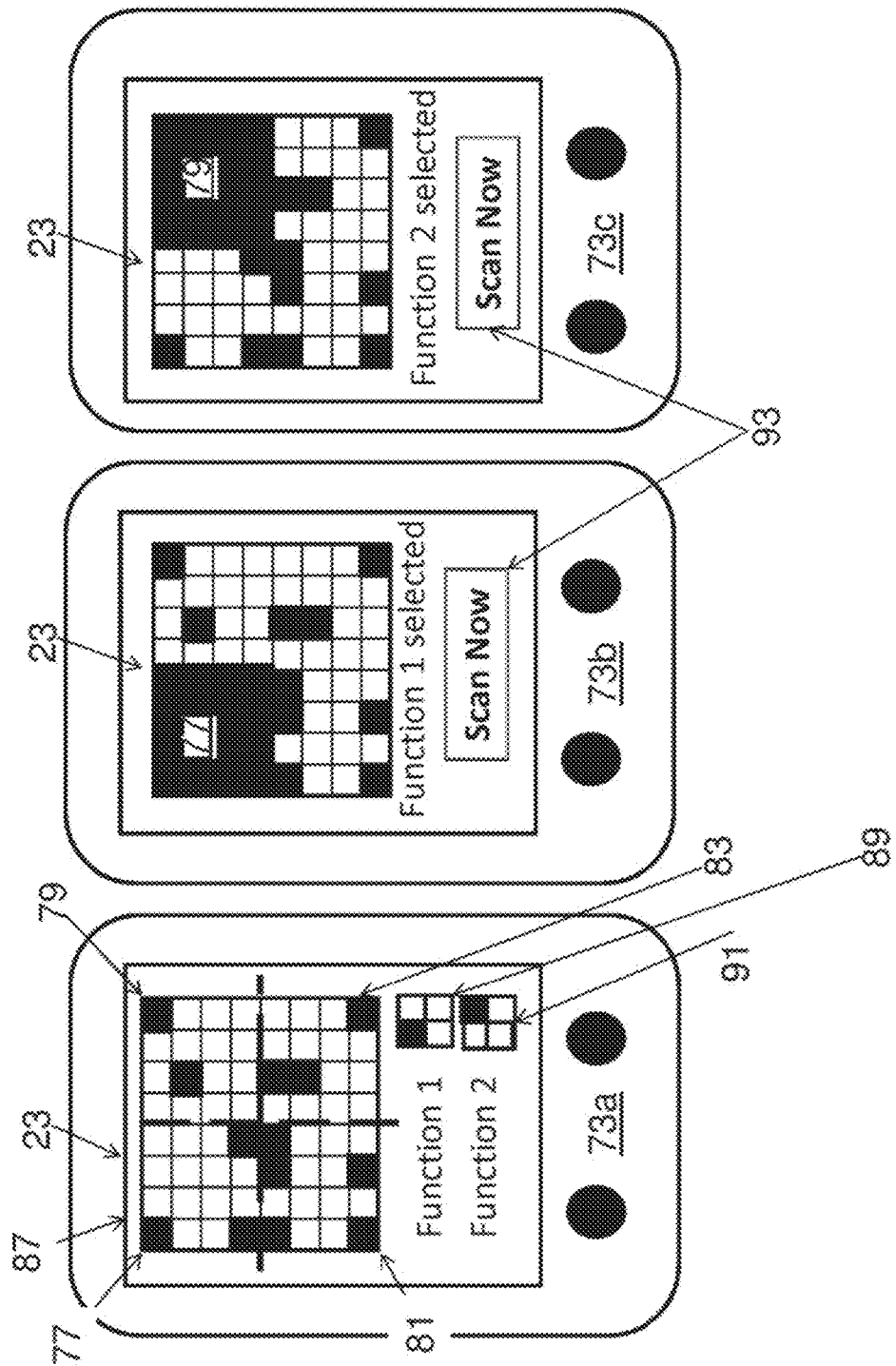
FIGS. 16 and 17 show an information element according to an embodiment of the present invention as displayed by a mobile computing device.

FIG. 16 shows three views of a mobile telecommunications device 73 (devices 73a, 73b, 73c) which is displaying an information element 23 similar to that shown in FIG. 15.

In the lefthand image of the device (device 73a), the information element 23 is located at the upper end of a display screen 87. The various functionality that the information element 23 may be used to trigger is indicated on the display screen 87, beneath the information element 23. As shown in the left hand image of FIG. 16, two functions are represented (Functions 1 and 2) on the display screen 37 underneath the information element 23. Next to each function is a representation (89, 91) of the information element 23 in which one of the quadrants of the element 23 has been obscured to indicate to the user of the device 73 how the information element 23 will be modified when a function is selected. It is noted that selecting one of the functions presented to the user on the display screen will change the on-screen representation of the information element 23 on the display screen 87. In the example of FIG. 16, if the user touches the representation 89 then the display device 73 will change the onscreen representation of the information element 23 as described below.

In the middle image (device 73b) Function 1 has been selected, it can be seen that the upper left quadrant 77 of the information element 23 shown in the lefthand image of the device 73 has now been obscured on the screen 87. Underneath the information element 23 a confirmation of the selected function is provided to the user plus an instruction 93 to re-scan the element 23 with the image capture device 39.

In the right-hand image (device 73c). Function 2 has been selected, it can be seen that the upper right quadrant 79 of the information element 23 shown in the left-hand image of the device 73 has now been obscured on screen 87. Underneath the information element 23 a confirmation of the selected function is provided to the user plus an instruction 93 to re-scan the element 23 with the image capture device 39.

Upon re-scanning (step 237) the middle or right-hand images (devices 73b or 73c) the processor attached to the image capture device 39 would determine which part of the information element 23 had been obscured and then perform a specific function depending on a pre-determined relationship between the visible part of the information element and a set of functions.

Where the information element 23 is displayed on the display screen 87 of a computing device (e.g. the mobile device 73 of FIG. 13), the display of the information element 23 may be managed by a computer program (e.g. a smartphone "app") running on the device.

Figure 18:
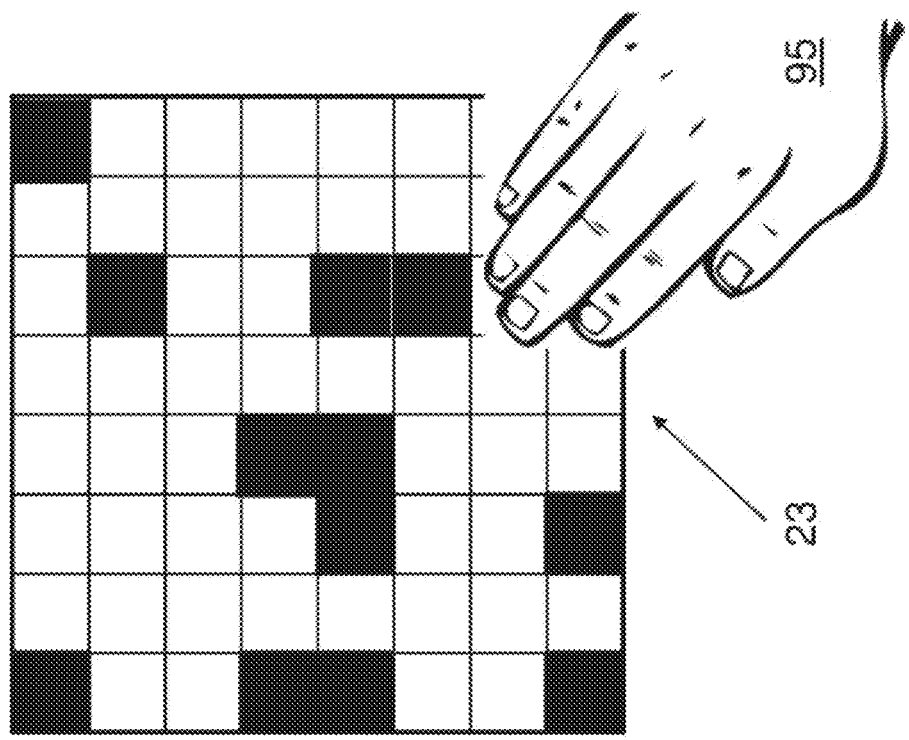
FIG. 18 shows an information element according to an embodiment of the present invention being partially obscured.
Figure 17:
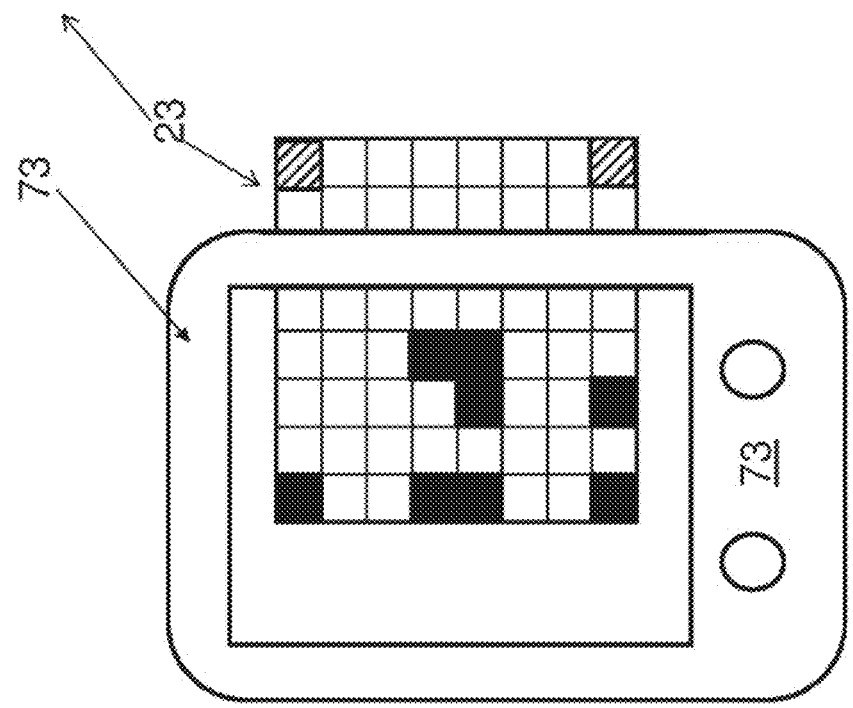

FIGS. 17 and 18 show two further mechanisms for interacting with an information element in accordance with further embodiments of the present invention.

In FIG. 17 the image capture device 39 (not shown in FIG. 17) is provided by a camera on the mobile telecommunications device 73, in use, the user may connect to the display system server 25 (e.g. via a Bluetooth® connection or via a Wi-Fi or other suitable wireless connection) so that the captured image of the scanned information element 23 can be sent to the server 25 for retrieval of the configured transaction item data. In Step 233 the mobile device 73 may be positioned over the information element 23 such that the entire element 23 is imaged by the camera. In Steps 235 and 237 the mobile device may be positioned, as shown in FIG. 17, such that only a part of the information element 23 is visible to the camera of the device. In this manner the visible part of the information element may be varied (Step 237) so that different functionality may be triggered.

In FIG. 18, the user's own hand 95 is used to obscure part of the information element 23.

Although the information element 23 is shown displayed on a user's mobile device 73 above it is to be appreciated that the information element may also be displayed on the second display device 33.

Further, although the image capture device 39 is described above as scanning the information element 23 it is to be appreciated that the image capture may take place via a camera device on the users mobile device 73 (for example, in the event that the user has printed the information element 23 onto a paper document 75 then they may scan the element 23 with their own mobile device 73 which could be linked via a wireless communications signal such as Bluetooth® or Wi-Fi to the display system 5/display server 25). The image capture may also take place via a camera device 63 on the second display device 33.

The functionality that is triggered by scanning the partially obscured information element 23 may include some or all of the following: changing the view of the object displayed on the first display device 29 (for example the user 45 could move through views 29a to 29e as shown in FIG. 5 by re-scanning the partially obscured element 23); opening a menu list of commands (on either the second display device 33 or the user's own mobile device 73); changing a trim option (for example re-scanning the element 23 could change the selected vehicle wheel assembly option displayed on the rendered simulation on the first display device 29); changing the colour of the simulated object 46 (for example re-scanning the element 23 could enable the user to sample a colour using the image capture device on their mobile device 73 and the simulated object 46 could be re-rendered in this colour).

In the above description the user is described as configuring a single transaction item (i.e. a single vehicle in the example described) with a single set of configuration options, it is to be appreciated that the lifecycle management process described with reference to FIG. 2 above may be arranged to allow the user to configure more than one set of configuration options for a particular transaction item and furthermore may be arranged to allow the user to configure multiple transaction items. In the example of the transaction item being a vehicle the user may configure two entirely different models of vehicle which can then be viewed via the display system 5. Where multiple transaction items are configured the method according to embodiments of the present invention may also allow multiple sets of configuration options be chosen for each of the multiple transaction items selected by the user.

Where a user has either multiple sets of configuration options or multiple transaction items (or both) to view on the display system the user may once the information element 23 has been scanned display a list of configurations/transaction items for the user to choose from. It is noted in this example that the same information element 23 has been associated by the server 3/database 21 to all the various user selected items/configurations.

In a further embodiment, manipulating the information element 23, by either obscuring it or rotating if, before rescanning if with the image capture device 39 may allow the user to access their various different configuration options or configured transaction items for display on the display system 5.

For ease of reference the various sections of the information element that can be obscured may be presented in a different visual manner to one another to aid the user. The different sections may be coloured differently or may be shaded differently. To provide a reference point to the image capture device some elements of the information element may be represented in the same manner across all sections of the information element, in FIG. 15 it is noted that the corner elements are all shaded in black whereas the remaining shaded cells ail fake one of four shading schemes.

The invention claimed is:

1. A method of interacting with an object, the method comprising:
   generating a simulation of the object;
   displaying the simulation on a first display device;
   interacting with the simulation on the first display device;
   capturing a representation of the simulation from the first display device for display on a second display device;
   displaying the representation of the simulation on the second display device;
   interacting with the representation of the simulation on the second display device; and
   changing configuration settings of the object on the second display device and sending the configuration settings such that the simulation on the first display device is updated to reflect the changed configuration settings;
   displaying one or more reference markers on the first display device, wherein capturing the representation of the simulation includes capturing an image of at least one of the one or more reference markers in order to locate the first display device and the display of the simulation within the field of view of an image capture means on the second display device, thereby providing a reference for the displayed simulation on the first display device orienting the second display device relative to the first display device; and
   moving the second display device relative to the first display device in order to change the view of the simulation on the second display device.

2. A method as claimed in claim 1, wherein the first display device is in communication with rendering means, the rendering means rendering the simulation of the object.

3. A method as claimed in claim 1, wherein the simulation is a three dimensional simulation of the object.

4. A method as claimed in claim 1, wherein interacting with the simulation on the first display device comprises interacting with a gesture control input mechanism.

5. A method as claimed in claim 1, wherein the simulation is animated so that interaction with the simulated object is arranged to mimic real world responses of the object.

6. A method as claimed in claim 1, wherein the second display device is part of a tablet computer or other mobile computing device.

7. A method as claimed in claim 6, wherein the mobile computing device comprises an image capture device and wherein capturing the representation of the simulation comprises taking an image of the simulation on the first display device with the image capture device of the second display device.

8. A method as claimed in claim 1, comprising interacting, on the second display device, via one or more of: a touch screen input device; gyroscopic input device; motion sensor based input device; speech input device.

9. A method as claimed in claim 1, wherein the representation of the simulation of the object on the second display device is a further simulation of the object, and wherein the simulation of the object on the first display device and the further simulation of the object on the second display device may be manipulated independently of one another.

10. A method as claimed in claim 9, wherein the simulation of the object on the first display device and the further simulation of the object on the second display device are rendered by the same rendering means.

11. A method as claimed in claim 9, wherein the second display device comprises a processing means and the further simulation of the object on the second display device is simulated by the processing means on the second display device.

12. A method as claimed in claim 1, wherein each reference marker is associated with a different display function on the second display device and capturing an image of different reference markers causes different pre-determined views of the simulated object or pre-determined functions to be launched.

13. A method as claimed in claim 12, wherein capturing an image of a reference marker causes a view of the object on the first display device to be displayed on the second display device.

14. A method as claimed in claim 1, wherein capturing a representation of the simulation on the first display device for display on a second display device comprises placing the second display device in a user's line of sight with the first display device, the second display device being arranged to display an augmented reality version of the image on the first display device.

15. A method as claimed in claim 14, wherein displaying the augmented reality version of the image on the first display device comprises overlaying an image captured from the first display device with a further image.

16. A method as claimed in claim 14, wherein the augmented reality version may be manipulated independently of the representation on the first display device.

17. A method as claimed in claim 1, wherein capturing a representation of the simulation from the first display device for display on a second display device comprises capturing an image of an information element with an image capture device on the second display device.

18. A non-transitory carrier medium for carrying a computer readable code for controlling a server to carry out the method of claim 1.

19. A method as claimed in claim 1, wherein the reference markers are invisible.

20. A method as claimed in claim 1, wherein capturing different reference markers of the one or more reference markers is arranged to select different views of the representation of the simulation on the second display device.

21. A method as claimed in claim 1, wherein the representation of the simulation displayed on the second display device corresponds to a portion of the simulation displayed on the first display device, and moving second display device relative to the first display device simulates a movement around an object shown on the second display device in order to view the object from a different angle.

22. A display system for interacting with an object, the system comprising:
   a first display device; and
   a second display device;
   wherein the system is arranged to:
      generate a simulation of the object;
      display the simulation on a first display device;
      display one or more reference markers on the first display device;
      allow a user to interact with the simulation on the first display device;
      allow a user to capture a representation of the simulation from the first display device for display on a second display device;
      display the representation of the simulation on the second display device;

allow a user to interact with the representation of the simulation on the second display device;

allow a user to change configuration settings of the object on the second display device;

send the configuration settings such that the simulation on the first display device is updated to reflect the changed configuration settings; and capture an image of at least one of the one or more reference markers in order to locate the first display device and the display of the simulation within the field of view of an image capture means on the second display device, the reference markers thereby providing a reference for the displayed simulation on the first display device orienting the second display device relative to the first display device;

wherein the system is configured to change the view of the simulation on the second display device in response to movement of the second display device relative to the first display device.

23. A system as claimed in claim 22, wherein the system is arranged to select different views of the representation of the simulation on the second display device when different reference markers of the one or more reference markers is captured.

24. A system as claimed in claim 22, wherein the representation of the simulation displayed on the second display device corresponds to a portion of the simulation displayed on the first display device, and wherein the system is configured such that moving the second display device relative to the first display device simulates a movement around an object shown on the second display device in order to view the object from a different angle.

* * * * *